United States Patent
Zhang et al.

(10) Patent No.: US 10,358,214 B2
(45) Date of Patent: *Jul. 23, 2019

(54) AERIAL VEHICLE AND METHOD OF OPERATION

(71) Applicant: Hangzhou Zero Zero Technology Co., Ltd, Beijing (CN)

(72) Inventors: Tong Zhang, Beijing (CN); Mengqiu Wang, Beijing (CN); Zhaozhe Wang, Beijing (CN); Xuyang Zhang, Beijing (CN); Guanqun Zhang, Beijing (CN); Shuang Gong, Beijing (CN); Yalin Zhang, Beijing (CN); Jinglong Wang, Beijing (CN); Lixin Liu, Beijing (CN)

(73) Assignee: Hangzhou Zero Zro Technology Co., Ltd., Hangzhou, Zhejiang Province (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/024,446

(22) Filed: Jun. 29, 2018

(65) Prior Publication Data

US 2018/0319496 A1    Nov. 8, 2018

Related U.S. Application Data

(63) Continuation-in-part of application No. 15/117,829, filed as application No. PCT/CN2015/099339 on (Continued)

(30) Foreign Application Priority Data

Aug. 4, 2015  (CN) ............... 2015 1 0472369
Aug. 31, 2015  (CN) ............... 2015 1 0547151
Dec. 29, 2015  (WO) ............. PCTCN15099327

(51) Int. Cl.
*B64C 39/02* (2006.01)
*B64C 27/08* (2006.01)

(52) U.S. Cl.
CPC ............ *B64C 39/024* (2013.01); *B64C 27/08* (2013.01); *B64C 2201/024* (2013.01); *B64C 2201/108* (2013.01); *B64C 2201/20* (2013.01)

(58) Field of Classification Search
CPC ... B64C 39/02; B64C 29/0025; B64C 39/024; B64C 2201/108; B64C 27/20; (Continued)

(56) References Cited

U.S. PATENT DOCUMENTS 3,083,935 A * 4/1963 Piasecki .............. B64C 29/0025
                                                        244/12.3
4,043,421 A   8/1977 Smith
(Continued)

FOREIGN PATENT DOCUMENTS

CH      333967      11/1958
CN     101976078    2/2011
(Continued)

OTHER PUBLICATIONS

International Search Report for PCT Application No. PCT/IB2018/000174 dated Jun. 27, 2018.
EP15875205.5 Search Report dated Dec. 22, 2017, 7 pages.

*Primary Examiner* — Medhat Badawi
(74) *Attorney, Agent, or Firm* — Jeffrey Schox; Diana Lin

(57) ABSTRACT

An aerial vehicle, preferably including: a rotary wing and a protection housing enclosing the rotary wing. An aerial vehicle, preferably including: a first rotary wing module including a first rotary wing and a second rotary wing module including a second rotary wing, wherein the first rotary wing module and the second rotary wing module are preferably operable between a folded configuration and an (Continued)

unfolded configuration. A method of aerial vehicle operation.

22 Claims, 8 Drawing Sheets

Related U.S. Application Data

Dec. 29, 2015, now abandoned, which is a continuation-in-part of application No. 15/035,934, filed as application No. PCT/CN2015/099327 on Dec. 29, 2015, now Pat. No. 10,035,589.

(60) Provisional application No. 62/099,512, filed on Jan. 4, 2015, provisional application No. 62/099,512, filed on Jan. 4, 2015.

(58) Field of Classification Search
CPC ........ B64C 2201/042; B64C 2201/027; B64D 3/00; B64D 35/06; F41B 11/80
See application file for complete search history.

(56) References Cited

U.S. PATENT DOCUMENTS

| | | | |
|---|---|---|---|
| 5,351,913 A | 10/1994 | Cycon et al. | |
| 5,419,514 A | 5/1995 | Duncan | |
| 5,503,351 A | 4/1996 | Vass | |
| 5,672,086 A | 9/1997 | Dixon | |
| 5,890,441 A | 4/1999 | Swinson et al. | |
| 6,260,796 B1 | 7/2001 | Klingensmith | |
| 6,270,038 B1* | 8/2001 | Cycon ................ | B64C 27/20 244/12.2 |
| 6,293,491 B1 | 9/2001 | Wobben | |
| 6,547,180 B1 | 4/2003 | Cassidy | |
| 6,688,936 B2 | 2/2004 | Davis | |
| 6,694,228 B2 | 2/2004 | Rios | |
| 6,745,977 B1 | 6/2004 | Long et al. | |
| 6,773,321 B1 | 8/2004 | Urquiaga | |
| 6,824,095 B2 | 11/2004 | Mao | |
| 6,840,480 B2 | 1/2005 | Carroll | |
| 6,843,447 B2 | 1/2005 | Morgan | |
| 6,928,363 B2 | 8/2005 | Sankrithi | |
| 7,011,274 B1 | 3/2006 | Hardoin | |
| 7,090,164 B2 | 8/2006 | Akaro et al. | |
| 7,159,817 B2 | 1/2007 | Vandermey et al. | |
| 7,267,300 B2 | 9/2007 | Heath et al. | |
| 7,306,186 B2 | 12/2007 | Kusic | |
| 7,334,755 B2 | 2/2008 | Svoboda, Jr. | |
| 7,341,223 B2 | 3/2008 | Chu | |
| 7,343,232 B2 | 3/2008 | Duggan et al. | |
| 7,429,997 B2 | 9/2008 | Givon | |
| 7,490,572 B2 | 2/2009 | Grober | |
| 7,540,450 B2 | 6/2009 | Brand et al. | |
| 7,542,828 B2 | 6/2009 | Steele et al. | |
| 7,712,701 B1 | 5/2010 | Ehrmantraut et al. | |
| 7,857,254 B2 | 12/2010 | Parks | |
| 7,959,104 B2 | 6/2011 | Kuntz | |
| 8,052,081 B2 | 11/2011 | Olm et al. | |
| 8,146,855 B2 | 4/2012 | Ismailov | |
| 8,177,159 B2 | 5/2012 | Khakimov et al. | |
| 8,275,412 B2 | 9/2012 | Alameh et al. | |
| 8,346,480 B2 | 1/2013 | Trepagnier et al. | |
| 8,430,709 B1 | 4/2013 | Wong | |
| 8,453,962 B2 | 6/2013 | Shaw | |
| 8,473,123 B2 | 6/2013 | Sun et al. | |
| 8,564,148 B1* | 10/2013 | Novak ................ | H02K 7/183 290/52 |
| 8,590,829 B2* | 11/2013 | Keidar ................ | B64C 39/022 244/23 R |
| 8,620,493 B2 | 12/2013 | Hughes et al. | |
| 8,695,919 B2 | 4/2014 | Shachor et al. | |
| 8,774,982 B2 | 7/2014 | Oakley et al. | |
| 8,876,039 B2 | 11/2014 | Lubenow et al. | |
| 8,903,568 B1 | 12/2014 | Wang et al. | |
| 8,907,846 B2 | 12/2014 | Sharawi et al. | |
| 8,938,160 B2 | 1/2015 | Wang | |
| 8,946,607 B2 | 2/2015 | Gettinger | |
| 8,958,928 B2 | 2/2015 | Seydoux et al. | |
| 8,991,740 B2 | 3/2015 | Olm et al. | |
| 9,004,393 B2 | 4/2015 | Barrett-Gonzales | |
| 9,004,396 B1 | 4/2015 | Colin et al. | |
| 9,051,050 B2 | 6/2015 | Achtelik et al. | |
| 9,079,115 B2 | 7/2015 | Huang et al. | |
| 9,085,355 B2 | 7/2015 | Delorean | |
| 9,108,729 B2 | 8/2015 | Duggan et al. | |
| 9,126,693 B1 | 9/2015 | Shi et al. | |
| D741,751 S * | 10/2015 | Klaptocz ................ | D12/16.1 |
| 9,174,732 B2 | 11/2015 | Jensen et al. | |
| 9,266,609 B1 | 2/2016 | Kunz | |
| D751,025 S * | 3/2016 | Howell ................ | D12/16.1 |
| 9,277,130 B2* | 3/2016 | Wang ................ | H04N 5/23287 |
| 9,290,267 B2 | 3/2016 | Metreveli | |
| 9,296,270 B2 | 3/2016 | Parks et al. | |
| 9,305,317 B2 | 4/2016 | Grokop et al. | |
| 9,317,036 B2 | 4/2016 | Wang et al. | |
| 9,321,531 B1* | 4/2016 | Takayama ................ | B64D 1/12 |
| 9,346,543 B2* | 5/2016 | Kugelmass ............ | G05D 1/101 |
| 9,346,546 B2 | 5/2016 | Markov | |
| 9,364,930 B2 | 6/2016 | Hethcock et al. | |
| 9,402,008 B2 | 7/2016 | Chen et al. | |
| 9,429,141 B2 | 8/2016 | Vander Lind et al. | |
| 9,457,899 B2 | 10/2016 | Duffy et al. | |
| 9,493,225 B2 | 11/2016 | Wang et al. | |
| 9,493,235 B2* | 11/2016 | Zhou ................ | B60F 5/02 |
| 9,527,597 B1* | 12/2016 | Sada ................ | B64C 39/024 |
| 9,540,105 B2 | 1/2017 | Markov | |
| 9,550,567 B1* | 1/2017 | Erdozain, Jr. ........ | B64C 29/02 |
| 9,567,076 B2 | 2/2017 | Zhang | |
| 9,573,683 B2 | 2/2017 | Martin et al. | |
| 9,589,595 B2 | 3/2017 | Gao et al. | |
| 9,625,907 B2 | 4/2017 | Hu et al. | |
| 9,630,710 B2 | 4/2017 | Hutson | |
| 9,635,248 B2 | 4/2017 | Yang et al. | |
| 9,688,400 B2 | 6/2017 | Hutson | |
| 9,696,725 B2 | 7/2017 | Wang | |
| 9,733,644 B2 | 8/2017 | Levien et al. | |
| 9,760,072 B2 | 9/2017 | Hall et al. | |
| 9,815,552 B1 | 11/2017 | Welsh | |
| 9,828,094 B2* | 11/2017 | McMillion ................ | B64D 1/22 |
| 9,836,053 B2 | 12/2017 | Wang et al. | |
| 9,840,339 B1 | 12/2017 | Obrien et al. | |
| 9,842,505 B2 | 12/2017 | Wang et al. | |
| 9,856,016 B2 | 1/2018 | Mueller et al. | |
| 9,889,930 B2* | 2/2018 | Welsh ................ | B64C 39/024 |
| 9,902,493 B2* | 2/2018 | Simon ................ | B64C 29/0025 |
| 9,908,632 B1* | 3/2018 | Kimchi ................ | B64C 27/00 |
| 9,914,538 B2* | 3/2018 | Yu ................ | B64C 39/024 |
| 2002/0142699 A1* | 10/2002 | Davis ................ | A63H 27/04 446/37 |
| 2003/0066932 A1 | 4/2003 | Carroll | |
| 2003/0192989 A1* | 10/2003 | Owen ................ | B64C 1/1469 244/118.5 |
| 2003/0212478 A1* | 11/2003 | Rios ................ | G05D 1/0044 701/2 |
| 2004/0035347 A1 | 2/2004 | Grober | |
| 2004/0059497 A1 | 3/2004 | Sankrithi | |
| 2004/0144890 A1 | 7/2004 | Mao | |
| 2004/0245374 A1 | 12/2004 | Morgan | |
| 2005/0178882 A1 | 8/2005 | Akaro et al. | |
| 2005/0230520 A1 | 10/2005 | Kusic | |
| 2006/0011780 A1 | 1/2006 | Brand et al. | |
| 2006/0151666 A1 | 7/2006 | Vandermey et al. | |
| 2006/0192046 A1 | 8/2006 | Heath et al. | |
| 2006/0266879 A1 | 11/2006 | Svoboda | |
| 2006/0284003 A1 | 12/2006 | Chu | |
| 2007/0023582 A1 | 2/2007 | Steele et al. | |
| 2007/0057113 A1 | 3/2007 | Parks | |
| 2007/0262195 A1 | 11/2007 | Bulaga et al. | |
| 2008/0048065 A1 | 2/2008 | Kuntz | |
| 2008/0054121 A1 | 3/2008 | Yoeli | |
| 2009/0008499 A1 | 1/2009 | Shaw | |
| 2010/0051741 A1 | 3/2010 | Ismailov | |

(56) References Cited

U.S. PATENT DOCUMENTS

| | | | |
|---|---|---|---|
| 2010/0096493 A1* | 4/2010 | Khakimov | A62B 5/00 244/25 |
| 2010/0108801 A1 | 5/2010 | Olm et al. | |
| 2010/0140416 A1 | 6/2010 | Ohanian et al. | |
| 2010/0167783 A1 | 7/2010 | Alameh et al. | |
| 2011/0017865 A1 | 1/2011 | Achtelik et al. | |
| 2011/0221692 A1* | 9/2011 | Seydoux | A63H 27/12 345/173 |
| 2011/0226892 A1 | 9/2011 | Crowther et al. | |
| 2012/0035788 A1 | 2/2012 | Trepagnier et al. | |
| 2012/0083945 A1 | 4/2012 | Oakley et al. | |
| 2012/0091258 A1 | 4/2012 | Keidar et al. | |
| 2012/0158215 A1* | 6/2012 | Sun | B64C 27/20 701/3 |
| 2012/0177497 A1 | 7/2012 | Huang et al. | |
| 2012/0200703 A1 | 8/2012 | Nadir et al. | |
| 2012/0248259 A1 | 10/2012 | Page et al. | |
| 2012/0267472 A1 | 10/2012 | Pratzovnick et al. | |
| 2012/0271461 A1 | 10/2012 | Spata | |
| 2012/0280080 A1 | 11/2012 | Lubenow et al. | |
| 2013/0134254 A1 | 5/2013 | Moore | |
| 2013/0146716 A1 | 6/2013 | Gettinger | |
| 2013/0214088 A1 | 8/2013 | Shachor et al. | |
| 2013/0297102 A1 | 11/2013 | Hughes et al. | |
| 2014/0025229 A1 | 1/2014 | Levien et al. | |
| 2014/0025234 A1 | 1/2014 | Levien et al. | |
| 2014/0026802 A1 | 1/2014 | Parks et al. | |
| 2014/0032034 A1 | 1/2014 | Raptopoulos et al. | |
| 2014/0037278 A1* | 2/2014 | Wang | F16M 11/10 396/55 |
| 2014/0061362 A1* | 3/2014 | Olm | B60F 5/02 244/2 |
| 2014/0061376 A1 | 3/2014 | Fisher et al. | |
| 2014/0099853 A1 | 4/2014 | Condon et al. | |
| 2014/0158816 A1 | 6/2014 | Delorean | |
| 2014/0218239 A1 | 8/2014 | Sharawi et al. | |
| 2014/0246545 A1 | 9/2014 | Markov | |
| 2014/0259628 A1* | 9/2014 | Hethcock | B26F 3/004 29/557 |
| 2014/0324253 A1 | 10/2014 | Duggan et al. | |
| 2014/0374532 A1* | 12/2014 | Duffy | B64C 37/02 244/2 |
| 2014/0376170 A1* | 12/2014 | Richard | G06F 1/203 361/679.32 |
| 2015/0097950 A1 | 4/2015 | Wang et al. | |
| 2015/0122950 A1 | 5/2015 | Markov | |
| 2015/0160658 A1 | 6/2015 | Reedman et al. | |
| 2015/0167492 A1* | 6/2015 | Collette | F01D 25/06 415/1 |
| 2015/0179219 A1 | 6/2015 | Gao et al. | |
| 2015/0184637 A1 | 7/2015 | Vander Lind et al. | |
| 2015/0205301 A1 | 7/2015 | Gilmore et al. | |
| 2015/0254988 A1 | 9/2015 | Wang et al. | |
| 2015/0266570 A1* | 9/2015 | Metreveli | B64C 27/20 244/17.23 |
| 2015/0274294 A1* | 10/2015 | Dahlstrom | B64D 1/18 239/722 |
| 2015/0274309 A1 | 10/2015 | Shi et al. | |
| 2015/0321755 A1 | 11/2015 | Martin et al. | |
| 2016/0023755 A1 | 1/2016 | Elshafei et al. | |
| 2016/0046373 A1 | 2/2016 | Kugelmass | |
| 2016/0070264 A1 | 3/2016 | Hu et al. | |
| 2016/0070265 A1 | 3/2016 | Liu et al. | |
| 2016/0080598 A1 | 3/2016 | Chen et al. | |
| 2016/0101856 A1* | 4/2016 | Kohstall | G05D 1/101 244/17.13 |
| 2016/0107751 A1 | 4/2016 | D'Andrea et al. | |
| 2016/0114887 A1 | 4/2016 | Zhou et al. | |
| 2016/0122015 A1* | 5/2016 | Hutson | B64C 39/024 244/17.23 |
| 2016/0122038 A1* | 5/2016 | Fleischman | G06T 7/73 701/2 |
| 2016/0144954 A1 | 5/2016 | Daigle | |
| 2016/0152316 A1 | 6/2016 | Wang et al. | |
| 2016/0152327 A1* | 6/2016 | Bertels | B64C 11/001 417/423.7 |
| 2016/0163203 A1 | 6/2016 | Wang et al. | |
| 2016/0176520 A1* | 6/2016 | Goldstein | B64C 39/024 244/17.17 |
| 2016/0191793 A1 | 6/2016 | Yang et al. | |
| 2016/0200415 A1* | 7/2016 | Cooper | A63H 27/12 244/17.15 |
| 2016/0207368 A1* | 7/2016 | Gaonjur | B60F 5/02 |
| 2016/0221671 A1 | 8/2016 | Fisher et al. | |
| 2016/0221683 A1* | 8/2016 | Roberts | B64D 27/02 |
| 2016/0229530 A1* | 8/2016 | Welsh | B64C 39/024 |
| 2016/0229534 A1* | 8/2016 | Hutson | B64C 27/08 |
| 2016/0280369 A1 | 9/2016 | Pounds | |
| 2016/0286128 A1* | 9/2016 | Zhou | H04N 5/23248 |
| 2016/0313742 A1 | 10/2016 | Wang | |
| 2016/0327956 A1 | 11/2016 | Zhang et al. | |
| 2016/0340035 A1* | 11/2016 | Duru | B64C 27/20 |
| 2016/0378108 A1 | 12/2016 | Paczan et al. | |
| 2017/0010623 A1 | 1/2017 | Tang et al. | |
| 2017/0011333 A1* | 1/2017 | Greiner | G06Q 10/083 |
| 2017/0023947 A1 | 1/2017 | McMillion | |
| 2017/0057630 A1* | 3/2017 | Schwaiger | B64C 3/385 |
| 2017/0057650 A1 | 3/2017 | Walter-Robinson | |
| 2017/0073070 A1* | 3/2017 | Xing | B64C 39/024 |
| 2017/0144753 A1 | 5/2017 | Yu | |
| 2017/0144757 A1* | 5/2017 | Hall | B64C 39/024 |
| 2017/0152060 A1* | 6/2017 | Morisawa | B64C 27/08 |
| 2017/0185084 A1 | 6/2017 | Wang et al. | |
| 2017/0217585 A1 | 8/2017 | Hulsman et al. | |
| 2017/0225783 A1 | 8/2017 | Fisher et al. | |
| 2017/0291697 A1 | 10/2017 | Kornatowski et al. | |
| 2017/0297707 A1 | 10/2017 | Rollefstad et al. | |
| 2017/0313418 A1* | 11/2017 | Yoon | B64C 27/08 |
| 2017/0322563 A1 | 11/2017 | Kohstall | |
| 2017/0359106 A1 | 12/2017 | John Wilson et al. | |
| 2018/0029703 A1 | 2/2018 | Simon et al. | |
| 2018/0099745 A1* | 4/2018 | Welsh | B64C 39/024 |
| 2018/0141672 A1 | 5/2018 | Bevirt et al. | |
| 2018/0155018 A1 | 6/2018 | Kovac et al. | |
| 2018/0194463 A1 | 7/2018 | Hasinski et al. | |

FOREIGN PATENT DOCUMENTS

| | | |
|---|---|---|
| CN | 102273083 | 12/2011 |
| CN | 102511162 A | 6/2012 |
| CN | 104197928 A | 12/2014 |
| CN | 104253887 | 12/2014 |
| CN | 204406209 | 3/2015 |
| CN | 104486543 | 4/2015 |
| CN | 104679013 | 6/2015 |
| CN | 104684805 A | 6/2015 |
| CN | 104685436 | 6/2015 |
| CN | 104743104 A | 7/2015 |
| CN | 204507263 U | 7/2015 |
| CN | 104991561 | 10/2015 |
| CN | 105035318 A | 11/2015 |
| CN | 105116909 | 12/2015 |
| CN | 105173072 A | 12/2015 |
| CN | 105182986 | 12/2015 |
| CN | 204822682 U | 12/2015 |
| CN | 105352505 A | 2/2016 |
| CN | 105425952 | 3/2016 |
| CN | 105836120 A | 8/2016 |
| CN | 106022274 A | 10/2016 |
| CN | 106204443 A | 12/2016 |
| CN | 106335635 A | 1/2017 |
| EP | 1901153 | 3/2008 |
| EP | 2731271 | 5/2014 |
| TW | 201226234 A | 7/2012 |
| WO | 112578 | 10/2006 |
| WO | 054937 | 4/2009 |
| WO | 2013066475 A3 | 6/2013 |
| WO | 2014003698 A1 | 1/2014 |
| WO | 080598 | 5/2016 |
| WO | 2016065623 A1 | 5/2016 |
| WO | 2016101227 A1 | 6/2016 |

(56) References Cited

FOREIGN PATENT DOCUMENTS

| | | |
|---|---|---|
| WO | 2016106715 A1 | 7/2016 |
| WO | 2016107528 A1 | 7/2016 |
| WO | 2016112124 A2 | 7/2016 |

* cited by examiner

AERIAL VEHICLE AND METHOD OF OPERATION

CROSS-REFERENCE TO RELATED APPLICATIONS

This application is a continuation-in-part of prior U.S. application Ser. No. 15/035,934, filed on 11 May 2016, which is a national stage entry of International Application No. PCT/CN2015/099327, titled "FOLDABLE DRONE", filed 29 Dec. 2015, which claims the benefit of U.S. Provisional Application No. 62/099,512, titled "FOLDABLE DRONE WITH FULLY PROTECTED PROPELLER GUARD SYSTEM", filed 4 Jan. 2015, and Chinese Patent Application No. 201510472369.7, titled "FOLDABLE DRONE", filed 4 Aug. 2015, all of which are incorporated in their entirety by this reference.

This application is a continuation-in-part of prior U.S. application Ser. No. 15/117,829, filed on 10 Aug. 2016, which is a national stage entry of International Application No. PCT/CN2015/099339, titled "FULLY-PROTECTED UNMANNED AERIAL VEHICLE", filed 29 Dec. 2015, which claims the benefit of U.S. Provisional Application No. 62/099,512, titled "FOLDABLE DRONE WITH FULLY PROTECTED PROPELLER GUARD SYSTEM", filed 4 Jan. 2015, and Chinese Patent Application No. 201510547151.3, titled "FULLY PROTECTED DRONE", filed 31 Aug. 2015, all of which are incorporated in their entirety by this reference.

TECHNICAL FIELD

The present application relates to the technical field of drones, and particularly to a foldable and/or fully protected drone.

BACKGROUND

An unmanned aircraft, abbreviated as a drone, is an unmanned air vehicle controlled either by a program control device thereof or by a wireless remote. The drone was first developed in 1940's, and was used as a target drone in military training at that time. The drone has a wide application, a low cost, and a high cost effectiveness ratio, and the drone will not cause human injuries, has a strong viability and a great maneuvering performance, and is easy to use. Thus, the drone not only plays an extremely important role in modern warfare, but also has a broader prospect in civilian fields. At present, drones have been widely applied to fields such as guard, urban management, agriculture, geology, meteorology, power, emergency rescue and disaster relief, video capture and the like.

Reference is made to FIG. 1, which is a schematic view showing the structure of a typical drone in the conventional technology.

As shown in FIG. 1, the drone in the conventional technology mainly includes five parts, including a body 10, rotary wings 20, motors 30, connecting rods 40 and a landing gear 50. The body 10 is generally configured to have a hemispheric shape. Several connecting rods 40 are mounted at intervals in a circumferential direction of the body 10, and each of the connecting rods 40 extends outwards in a radial direction of the body 10. Each of the rotary wings 20 is connected to the respective motor 30 through a rotary wing shaft on the rotary wing 20, to form one structural body. The structural bodies formed by the rotary wings 20 and the motors 30 are respectively mounted on outer ends of the connecting rods 40, to connect the rotary wings 20 and the motors 30 to the body 10. Also, the landing gear 50 is connected to the body 10, thus the entire drone can be supported by the landing gear 50, and flying and retrieval of the drone can be achieved by the landing gear 50.

However, as shown in FIG. 1, the above conventional drone has the following technical issues.

When the conventional drone is flying stably, the rotating speed of the rotary wing 20 is equal to or greater than 10000 rpm. Therefore, whether in a professional application field of the drone or for amateurs, accidents of injuries caused by the rotary wing 20 of the drone happen occasionally. That is to say, the drone in the conventional technology has a low security.

Furthermore, as shown in FIG. 1, in the above conventional drone, the rotary wings 20, the motors 30, the body 10 and the landing gear 50 are located in three planes at different levels, thus the height of the drone is increased to a large extent, which is not convenient to carry the drone.

Therefore, an urgent technical issue to be addressed by the person skilled in the art is to design a fully protected drone, to improve the operation security of the drone and to assist in improving the portability of the drone.

Unmanned aerial vehicle, referred to as drone, is an unmanned air vehicle controlled either by a wireless remote control equipment or by its own program control device. The drone was first developed in 1940's, and was used as a target craft in military training at that time. The drone has a wide application, a low cost, and a high cost effectiveness ratio. The drone has no risk of causing human injuries, a strong viability and a great maneuvering performance, and is easy to use. Thus, the drone not only plays an extremely important role in modern warfare, but also has a broad prospect in civilian field. At present, drones are widely used in fields such as guard, urban management, agriculture, geology, meteorology, power, emergency rescue and disaster relief, and video capture.

In the conventional technology, some drones with a fixed wing may have only one rotary wing, and some helicopter type drones may have two or more rotary wings. According to the mechanical features of the rotary wing, each rotary wing rotates to cause ambient airflow to change, thus generating a lift force. Thus, each rotary wing needs to correspond to a certain independent space, in order to create condition for generating the lift force. That is to say, in solutions of the conventional drone, the rotary wing occupies most part of a cross section of the drone, and also causes inconvenience to carrying of the drone.

Therefore, a technical issue to be addressed presently by those skilled in the art is to design a foldable drone, which can be folded up when not in use, to improve the portability of the drone.

Figure 1:
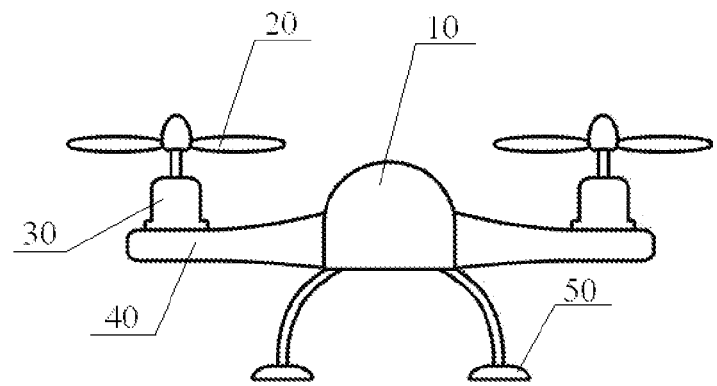
FIG. 1 is a schematic view showing the structure of a typical drone in the conventional technology.

Reference numerals in FIG. 1: 10 body, 20 rotary wing, 30 motor, 40 connecting rod, and 50 landing gear.

Reference numerals in FIGS. 2 to 6: 1 drone body, 2 rotary wing, 21 rotary wing body, 22 wing portion, 3 protection housing, 31 hollow cavity, 32 top plate, 321 mounting portion, 33 bottom plate, 34 middle frame, 341 side plate, 342 end plate, and 4 motor.

Reference numerals in FIGS. 7 to 12: 1 drone body, 2 first rotary wing module, 3 second rotary wing module, 4 articulating shaft, 41 connecting end, 5 first positioning member, 6 second positioning member, 7 first gear, 8 second gear, and 9 threaded hole.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

An object of the present application is to provide a fully protected drone, to improve the operation security and portability of the drone.

In order to address the above technical issues, a fully protected drone is provided according to the present application, which includes a drone body and a rotary wing connected to the drone body, and further includes a protection housing connected to the drone body, the protection housing is a meshed closed housing and has a hollow cavity, and the rotary wing is mounted in the hollow cavity.

The fully protected drone according to the present application has a protection housing, the rotary wing is mounted in the hollow cavity of the protection housing, and thus the rotary wing will not contact the human body of an operator, thus the operator can fly and retrieve the drone by hand, and a landing gear in the conventional technology is omitted, which improves the operation convenience of the rotary wing. Furthermore, since the rotary wing will not contact the human body, the operation security is improved to a large extent. Moreover, the protection housing is configured as a meshed closed housing, and the meshed structure provides a space for the rotary wing to generate lift force, thereby ensuring the normal flight of the drone. With the closed housing, a sharp tip can be avoided, which further improves the operation security and prevents the housing from causing injuries to the human body. Compared with the conventional technology in which a rotary wing is fixed above the drone body through a connecting rod, the rotary wing according to the present application is mounted in the protection housing connected to the drone body, and the connecting rod is omitted, thereby not only simplifying the structure of the drone, but also reducing the overall height of the drone and improving the portability of the drone.

Optionally, the protection housing includes a top plate, a bottom plate and a middle frame, the middle frame is configured to have a U shape and is connected to the drone body through an open end of the U shape; and the top plate and the bottom plate are respectively mounted on a top surface and a bottom surface of the middle frame, to enclose the middle frame to form the hollow cavity.

Optionally, several mounting portions for mounting the rotary wing are provided on the top plate.

Optionally, the mounting portions are arranged at intervals from one side to another side of the middle frame.

Optionally, the middle frame is detachably connected to the drone body; and the top plate and/or the bottom plate is detachably connected to the middle frame.

Optionally, the top plate and/or the bottom plate includes a plurality of first sub-plates spliced together; and the middle frame includes two side plates and an end plate connected between tail ends of the two side plates, and the side plate and/or each of the end plates includes a plurality of second sub-plates spliced together.

Optionally, the rotary wing includes a rotary wing body and a wing portion extending out from the rotary wing body, the rotary wing body is in the form of a hollow housing, and a motor is nested in the hollow housing.

Optionally, the protection housing has a hollow rate ranging from 80% to 90%.

Optionally, the meshed structure of the protection housing is in the form of a regular hexagon, and a radius of a circumscribed circle of the regular hexagon ranges from 6 mm to 8 mm.

Optionally, the protection housings are symmetrically arranged at two sides of the drone body, top surfaces of the protection housings at the two sides are joined with a top surface of the drone body to be flush with the top surface of the drone body, and bottom surfaces of the protection housings at the two sides are joined with a bottom surface of the drone body to be flush with the bottom surface of the drone body, to form a cuboid drone.

A core of the present application is to provide a fully protected drone, to improve the operation security and the portability of the drone.

It should be noted that, terms such as "first", "second" and the like in the present application are only intended to distinguish multiple components or structures having the same or similar structures from each other, rather than define particular arrangement order or connection relationship.

In the present application, the directions "up", "down", "left" and "right" are defined with reference to a drone body 1. The direction in which the drone faces the ground in a using state is defined as "down", and the direction opposite to "down" is defined as "up"; and the direction in which the drone body 1 extends is defined as the "front and rear direction", and in a plane parallel to the drone body 1, the direction perpendicular to the front and rear direction is the "left and right direction".

A drone according to the present application is described in detail hereinafter in conjunction with drawings, to help those skilled in the art to accurately understand the technical solutions of the present application.

Figure 2:
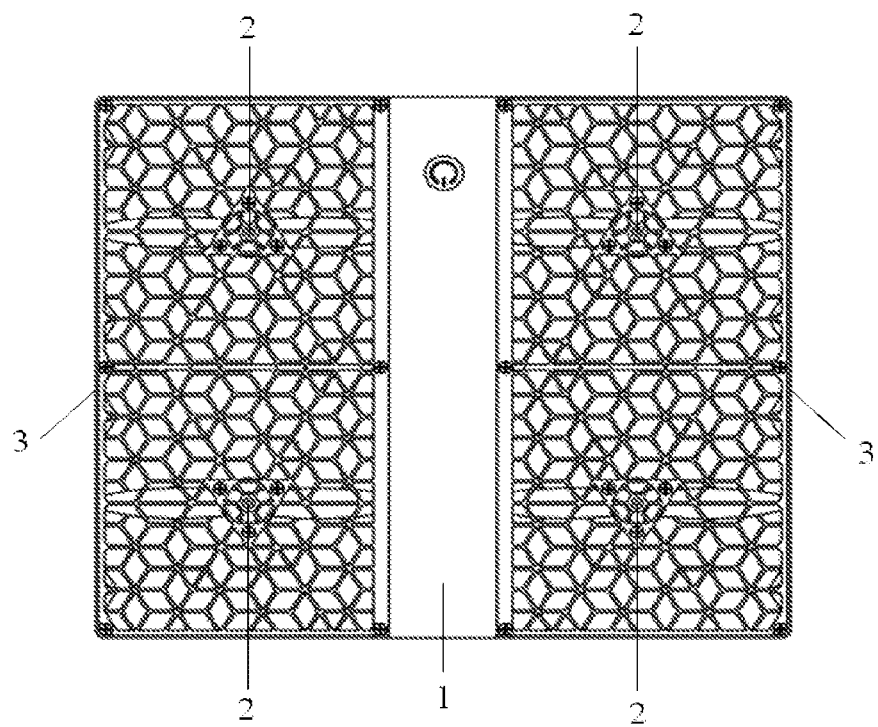
FIG. 2 is a top view of a fully protected drone according to an embodiment of the present application.
Figure 3:
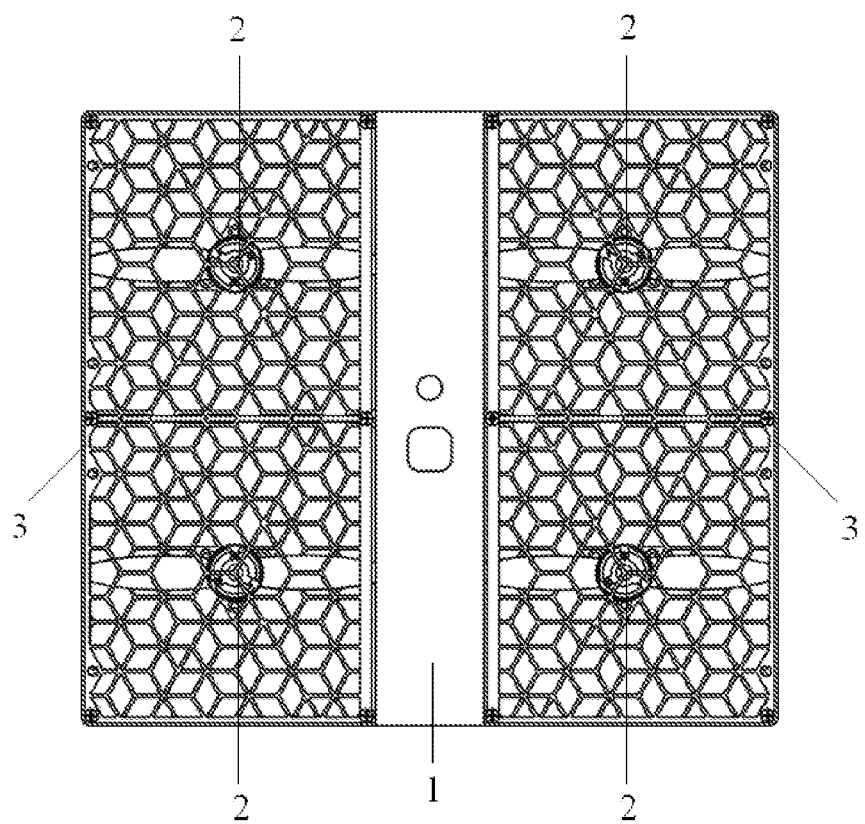
FIG. 3 is a bottom view of a fully protected drone according to an embodiment of the present application.
Figure 4:
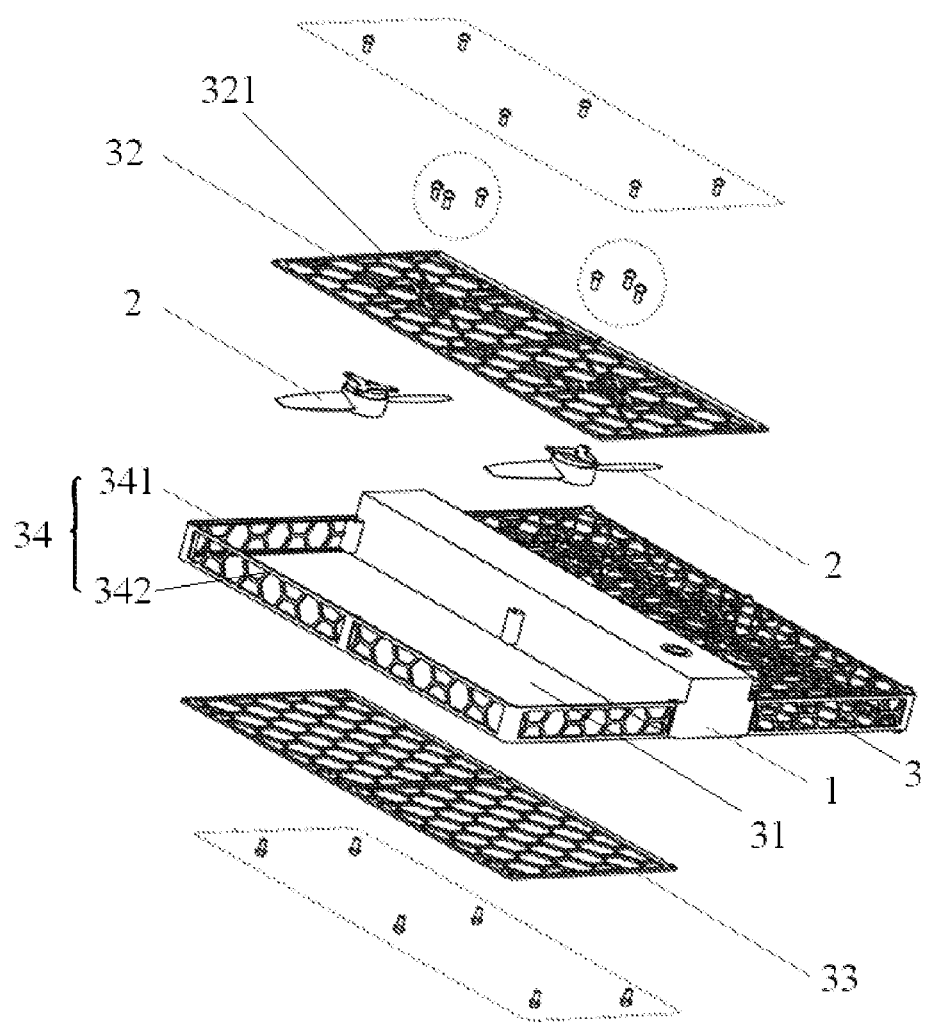
FIG. 4 is an exploded perspective view showing the assembling of a fully protected drone according to an embodiment of the present application.

As shown in FIGS. 2 to 4, a fully protected drone (abbreviated as drone hereinafter) is provided according to the present application, and includes a drone body 1, and a protection housing 3 and a rotary wing 2 which are connected to the drone body 1. The protection housing 3 is a meshed closed housing and has a hollow cavity 31. The rotary wing 2 is mounted in the hollow cavity 31 of the protection housing 3. The drone body 1 may be configured to have a hollow box-like shape, and a control element may be installed in the drone body 1 to control the drone. As shown in FIG. 2, a switch may be arranged on the drone body 1 and may be electrically connected to the control element, to start and stop the drone via the switch. The protection housing 3 may be configured to have a meshed structure in any forms capable of being connected to the drone body 1. The meshed structure has various forms, may be of a regular or irregular geometrical shape, and may also in the form of other patterns and the like. The form of the meshed structure is not limited, as long as it can ensure that the drone has a certain hollow rate.

With the above structure, the rotary wing 2 is internally mounted in the protection housing 3, an operator will not directly contact the rotary wing 2, and can fly and retrieve the drone by hand, and thus a landing gear in the conventional technology is omitted, which improves the operation convenience. During the operation, the operator does not contact the rotary wing 2, which avoids the human body from being injured by the rotary wing 2 spinning at a high speed, thereby improving the operation security. The protection housing 3 is configured to have a meshed structure, and the hollow area provides an adequate space for the rotary wing 2 to generate a lift force, while meeting the requirement for griping, thereby ensuring the normal flight of the drone. The protection housing 3 is configured to have a closed housing structure which has no sharp corner and will not have a sharp tip which may cause injury to the human body, and the operator may hold any portions of the protection housing 3, thereby further improving the security and convenience in holding the drone. The rotary wing 2 is internally mounted in the protection housing 3 and is connected to the drone body 1 through the protection housing 3. Compared with the conventional technology in which the rotary wing 2 is connected above the drone body 1 through a connecting rod, the structure, in which the rotary wing 2 is internally mounted, reduces an overall height of the drone, thereby improving the portability of the drone.

The protection housing 3 may have various structures, as described above, as long as the protection housing 3 can satisfy the installation requirement of the rotary wing 2 and has a certain hollow rate. For example, the protection housing 3 may be configured as a quadrate hollow housing, or to have other forms such as circular shape, triangular shape, trapezoid and the like.

As shown in FIG. 4, in the fully protected drone according to the present application, the protection housing 3 may be configured to have an approximately quadrate structure and may include a middle frame 34, a top plate 32 and a bottom plate 33. The top plate 32 and the bottom plate 33 are respectively connected at a top portion and a bottom portion of the middle frame 34, to close the middle frame 34 from the top and the bottom, thereby forming a U-shaped closed frame with an end open. In this case, the middle space enclosed by the frame constitutes the hollow cavity 31 for installing the rotary wing 2.

In the above structure, the top plate 32 and the bottom plate 33 are equivalent to a top cover and a bottom cover of the middle frame 34, and the middle frame 34 constitutes a body structure of the protection housing 3. In detail, the middle frame 34 may be configured in the form of U shape and specifically in the form of U shape when being viewed from the top. The open end of the U shape directly faces the drone body 1, and the middle frame 34 is connected to the drone body 1 through the open end of the U shape. As shown in FIG. 4, two sides of the open end of the U shape correspond to a front end and a rear end of the drone body 1, and the two sides of the open end of the U shape are respectively connected to the front end and the rear end of the drone body 1 by welding, riveting, threaded connection or other manners. The top plate 32 may be mounted at a top surface of the middle frame 34 to cover the top of the middle frame 34, thereby closing the top of the middle frame 34. The bottom plate 33 may be mounted at a bottom surface of the middle frame 34, to block the bottom of the middle frame 34, thereby closing the bottom of the middle frame 34. In this way, a U-shaped frame structure with one open end is eventually formed. This frame structure is the protection housing 3 of the present application, and the middle cavity enclosed by the frame structure is the hollow cavity 31.

In the above protection housing 3, the top plate 32 and the bottom plate 33 may be directly fixedly mounted onto the middle frame 34 and then connected to the drone body 1 through the middle frame 34. The top plate 32 and the bottom plate 33 may be connected to the middle frame 34 in a detachable manner, such as threaded connection and the like, and may also be fixedly connected to the middle frame 34 in a fixed manner, such as welding and the like. The top plate 32 and the bottom plate 33 may also be directly connected to the drone body 1 rather than via the middle frame 34. In the embodiment shown in FIG. 4, by taking the protection housing 3 at the left side of the drone body 1 as an example, the middle frame 34 of the protection housing 3 is connected, through its open end, to a left side surface of the drone body 1 and thus the open end of the middle frame 34 is closed by the left side surface of the drone body 1, to form a circumferentially closed structure. In this case, a connecting hole location can be provided at the left side surface of the drone body 1, for example, the connecting hole location is provided at the middle of the left side surface or in each of a front end and a rear end of the left side surface, thus each of the top plate 32 and the bottom plate 33 can be connected to the drone body 1 through a respective end next to the drone body 1. Of cause, positioning of the top plate 32 and the bottom frame 33 can also be achieved by providing the connecting hole location at the connection portion between the drone body 1 and the middle frame 34, and specifically, the connecting hole location may be provided at the open end of the middle frame 34 or at each of the front end and the rear end of the drone body 1. The connecting hole location may also be provided at a side surface of the middle frame 34 which is parallel to the left side surface of the drone body 1, to position another ends (i.e. the ends away from the drone body 1) of the top plate 32 and the bottom plate 33.

Specifically, the rotary wing 2 may be mounted on the top plate 32 or the bottom plate 33, and in an arrangement manner, the rotary wing 2 may be mounted on the top plate 32. As shown in FIGS. 2 to 4, several mounting portions 321 may be provided on the top plate 32, and the mounting portions 321 correspond to the rotary wings 2, and thus each of the rotary wings 2 may be mounted on the respective mounting portion 321. In the case that the rotary wing 2 is mounted on the top plate 32, in one aspect, a part of the space in the hollow cavity 31 below the rotary wing 2 can provide a space to allow the rotary wing 2 to rotate, thereby reducing air resistance to the rotary wing 2, and allowing the rotary wing 2 to generate enough lift force; and in another aspect, during flying and retrieving the drone by hand, the operator is used to hold the lower part of the drone, thus in the case that the rotary wing 2 is mounted on the top plate 32, the contact between the rotary wing 2 and the human body can be effectively avoided, thereby ensuring an effective protection of the human body.

In the embodiment shown in FIGS. 2 to 4, a triangular connecting element may be arranged on the top of the rotary wing 2. The mounting portion 321 may be arranged at a position corresponding to the top plate 32, and may be specifically embodied as mounting holes corresponding to three corners of the connecting element, and then the connecting element is connected to the mounting portion 321 by a connector, such as a bolt, a pin or the like.

The mounting portions 321 may be arranged according to the number of the rotary wings 2 and the distribution of the rotary wings 2. For example, by taking an extending direction of the drone body 1 as the front and rear direction, several of the mounting portions 321 may be arranged at intervals on the top plate 32 from front to rear. Since the middle frame 34 is connected to the drone body 1 through its open end, the arrangement of the mounting portions 321 at intervals from front to rear is the arrangement of the mounting portions 321 at intervals in a direction from one side to another side of the middle frame 34. The intervals between the individual mounting portions 321 may be equal or different. The position of individual mounting portion 321 can be adjusted by those skilled in the art according to the installation requirement of the rotary wings 2.

As described above, the connection between the middle frame 34 and the drone body 1, the connection between the top plate 32 and the middle frame 34, and the connection between the bottom plate 33 and the middle frame 34 may each be achieved in a detachable manner. The detachable connection refers to the connection that can be detached as required without damaging the connector, such as threaded connection, pin connection and the like.

In addition, in the present application, each of the top plate 32, the bottom plate 33 and the middle frame 34 may be configured as an integrated structure or may be configured as a separated structure that can be spliced together. In detail, the top plate 32 may include several first sub-plates, and the first sub-plates may be spliced to form a plate-like integrated part that can match with the drone body 1 and the middle frame 34. Similarly, the bottom plate 33 may also include several first sub-plates, and the several first sub-plates are spliced to form an integrated plate-like structure and may be specifically arranged with reference to the top plate 32.

The middle frame 34 may include two side plates 341 and an end plate 342 connected at tail ends of the two side plates 341. A head end of each of the side plates 341 is connected to the drone body 1, and the tail end of the side plate 341 refers to an end opposite to the head end. Meanwhile, each of the side plates 341 may include second sub-plates configured to be spliced together, the end plate 342 may also include second sub-plates configured to be spliced together, and the second sub-plates can be spliced as required to form a desired structure of the middle frame 34.

With the above structural form that can be spliced, the protection housing 3 according to the present application can be adjusted as required, for example by adjusting the length and width of the top plate 32, the length and width of the bottom plate 33, the length, width and height of the middle frame 34, the structural form of the top plate 32, the bottom plate 33 and the middle frame 34 and the like. In this way, the protection housing 3 can match with the drone body 1, to mount four rotary wings 2 or other numbers of rotary wings 2, thereby effectively extending the application range of the protection housing 3 and improving the convenience in assembling and disassembling the protection housing 3.

The top plate 32, the bottom plate 33 and the middle frame 34 may also be configured as a foldable structure or other portable structures as desired.

Figure 5:
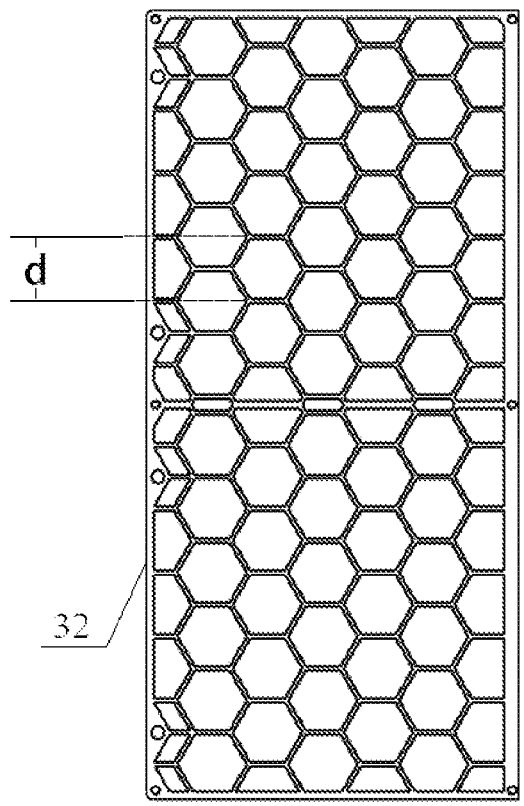
FIG. 5 is a top view showing an arrangement of a protection housing of the fully protected drone in the present application.

On this basis, reference is further made to FIG. 5. In the present application, the protection housing 3 may have a hollow rate of 80% to 90%. The hollow rate refers to the percentage of a hollow area in an overall area of the protection housing 3. After a series of tests of the relationship between the hollow area and the power loss of the rotary wing 2, the following data are obtained: in the case that the hollow rate is 90%, the power loss of the rotary wing 2 is 6%; in the case that the hollow rate is 85%, the power loss of the rotary wing 2 is 11%; and in the case that the hollow rate is 80%, the power loss of the rotary wing 2 is 18%. Hence, in the embodiments of the present application, the hollow rate is limited in the above range in the case that an overall weight of the drone, a structure stability required for fixing the motor 4 to the meshed structure, a structure ruggedness required for hand-holding the drone, and an overall flight efficiency are all considered.

In more detail, the meshed structure of the protection housing 3 may be a regular hexagonal grid pattern mesh, as shown in FIG. 5. In this case, the radius of a circumscribed circle of the regular hexagon is controlled between 6 mm to 8 mm, to meet the hollow rate. As shown in FIG. 5, the regular hexagons may be arranged sequentially in the front and rear direction, and in this case, centers of the regular hexagons are on the same extending line in the front and rear direction, and a distance between each adjacent regular hexagons may be defined as d. In view of the above considerations, d can be defined as 12 mm, and correspondingly, in this case, the hollow rate is 85%, which provides a great usability.

Moreover, in the present application, the meshed structure may be made of a carbon fiber plate, that is, the protection housing 3 may be made of a carbon fiber plate. In this case, the drone has a light weight, and thus can better meet the flight requirement in the case that the rotary wing 2 has a certain power loss.

For the drone of the present application, two sides of the drone body 1 may be each provided with the protection housing 3, and the protection housings 3 at the two sides of the drone body 1 may be symmetrically arranged in the left and right direction with respect to the drone body 1, such as the drone with four rotary wings 2 as shown in FIGS. 2 to 4. Furthermore, top surfaces of the two protection housings 3 at the two sides are flush with the top surface of the drone body 1, that is, the top surfaces of the two protection housings 3 and the top surface of the drone body 1 are located in the same plane. The bottom surfaces of the two protection housings 3 are flush with the bottom surface of the drone body 1, that is, the bottom surfaces of the two protection housings 3 and the bottom surface of the drone body 1 are located in the same plane. In this case, the whole drone is of a cuboid integral structure as shown in FIGS. 2 and 3. This cuboid drone has a small thickness and easy to carry. More importantly, this structure allows the drone to subject to a small air resistance during flight, and thus the drone has a better flight ability.

Figure 6:
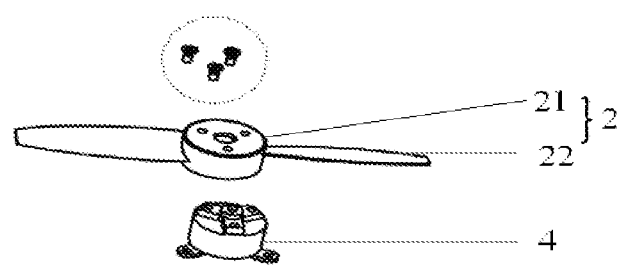
FIG. 6 is an exploded perspective view showing the assembling of a rotary wing and a motor in the fully protected drone according to an embodiment of the present application.

Reference is further made to FIG. 6, in the drone of the present application, the rotary wing 2 may further include a rotary wing body 21 and several wing portions 22. Each of the wing portions 22 extends out from the rotary wing body 21. The rotary wing 2 shown in FIG. 6 has two wing portions 22. Meanwhile, the rotary wing body 21 may be in the form of a hollow casing, thus the motor 4 can be nested in the rotary wing body 21 and the rotary wing 2 and the motor 4 may form a nested structure. In this way, in one aspect, the space occupied by the motor 4 is saved to reduce the overall height of the drone; and in another aspect, the motor 4 and the rotary wing 2 form a nested integrated structure, thus it is not necessary to separately mount the motor 4, which improves the convenience in assembling and disassembling and eventually allows the drone according to the present application to have an ultra-thin structure.

As shown in FIG. 6, for mount the motor 4, the motor 4 may be fixed at a top surface of the rotary wing body 21 by a connector such as a bolt or the like, or, the motor 4 may be hung in the rotary wing body 21. Other fixed connection manners may also be utilized to mount the motor 4, such as snap fitting or the like.

It should be noted that, the term "several" used herein refers to that the number is undetermined, and may be two or more than three, or may be one, and can be set as desired; terms such as "first", "second" and the like used herein are merely intended to distinguish different components with the same or similar structures from each other, rather than define a particular order.

The fully protected drone according to the present application is described in detail hereinbefore. The principle and the embodiments of the present application are illustrated herein by specific examples. The above description of examples is only intended to help the understanding of the core concept of the present application. It should be noted that, for the person skilled in the art, a few of modifications and improvements may be made to the present application without departing from the principle of the present application, and these modifications and improvements are also deemed to fall into the scope of the present application defined by the claims.

An object of the present application is to provide a foldable drone, to improve the portability of the drone.

In order to address the above technical issues, a foldable drone is provided according to the present application, which includes a drone body and a rotary wing part connected to the drone body, wherein the rotary wing part includes a first rotary wing module and a second rotary wing module with each having at least one rotary wing, and the first rotary wing module and the second rotary wing module are respectively articulated to two sides of the drone body, to allow the first rotary wing module and the second rotary wing module to rotate about their respective articulating shafts thus being folded or unfolded.

The drone according to the present application includes a drone body and a rotary wing part, specifically, the rotary wing part includes the first rotary wing module and the second rotary wing module, both of which are respectively articulated to two sides of the drone body, and the first rotary wing module and the second rotary wing module may rotate about their respective articulating shafts, to allow the first rotary wing module and the second rotary wing module to be folded, thereby folding up the drone, and facilitating carrying of the drone. When the drone is required to be used, the first rotary wing module and the second rotary wing module may be unfolded, and in this case, the both rotary wing modules respectively have relatively independent spaces, to allow lift forces to be generated by the rotation of the rotary wings, thus allowing the drone to be in a flying state.

Thus, the rotary wings of the drone according to the present application is performed with modular design, and two rotary wing modules which can be folded to be overlapped or unfolded are firstly formed, and then folding and unfolding are achieved by the turning and rotation of the rotary wing module, to change the state of the drone, thus meeting the requirements for folding and flying of the drone, and improving the portability of the drone. Furthermore, lines and control modules required by the drone may all be built in the drone body, without being required to be separately disposed in the various rotary wing modules, thus improving the reliability of the control, and improving the integrity of the drone, and simplifying the structure of the rotary wing to a certain extent.

Optionally, first positioning members in cooperation with each other are provided on surfaces, facing towards each other, of the first rotary wing module and the second rotary wing module, to allow the first rotary wing module and the second rotary wing module to be fixed to each other by the first positioning members when the first rotary wing module and the second rotary wing module are folded.

Optionally, second positioning members in cooperation with each other are provided on surfaces, facing towards each other, of the first rotary wing module and the drone body, and/or second positioning members in cooperation with each other are provided on surfaces, facing towards each other, of the second rotary wing module and the drone body, to allow the first rotary wing module and the second rotary wing module to be fixed to the drone body by the second positioning members in the case that the first rotary wing module and the second rotary wing module are unfolded.

Optionally, the first rotary wing module and the second rotary wing module can be unfolded into the same plane; and/or, the first rotary wing module and the second rotary wing module can be unfolded into the same plane as the drone body, or the plane formed by the first rotary wing module and the second rotary wing module unfolded is in parallel with one surface of the drone body.

Optionally, a vertical cross section of the drone body is of a T shape, and the articulating shaft extends from two ends of a vertical portion of the T shape, to form connecting ends for connecting the first rotary wing module or the second rotary wing module; and the first rotary wing module and the second rotary wing module are in parallel with and fit a transverse portion of the T shape when the first rotary wing module and the second rotary wing module are unfolded.

Optionally, in the case that the first rotary wing module and the second rotary wing module are folded, outer side surfaces of the first rotary wing module and the second rotary wing module are both not beyond outer side surfaces of the drone body.

Optionally, the first rotary wing module is provided with a first gear, and the second rotary wing module is provided with a second gear engaged with the first gear, axes of the first gear and the second gear are respectively parallel to the respective articulating shafts on the same sides as the first gear and the second gear.

Optionally, the two articulating shafts are arranged in the drone body, and the first gear and the second gear are respectively sleeved on and articulated to the respective articulating shafts on the same sides as the first gear and the second gear.

Optionally, each of the first rotary wing module and the second rotary wing module includes at least two rotary wings connected to each other, and the rotary wings are arranged linearly.

Optionally, in the first rotary wing module and the second rotary wing module, two adjacent rotary wings are articulated, and one of the rotary wings constitutes a basic rotary wing, and other rotary wings constitute folding rotary wings, the first rotary wing module and the second rotary wing module are articulated to the drone body via the basic rotary wing; and the folding rotary wings can be folded to the basic rotary wing sequentially, or unfolded from the basic rotary wing sequentially.

A core of the present application can include providing a foldable drone, e.g., which can improve the portability of the drone.

It should be noted that, terms such as "first", "second" and the like in the present application are only intended to distinguish multiple components or structures having the same or similar structures, rather than to particularly limit the arrangement order or connection relationship.

A drone according to the present application is described in detail hereinafter in conjunction with drawings, to help those skilled in the art to accurately understand the technical solutions of the present application.

As shown in FIGS. 7 to 12, a foldable drone is provided according to the present application, which includes a drone body 1 and a rotary wing part connected to the drone body 1. Specifically, the rotary wing part includes a first rotary wing module 2 and a second rotary wing module 3. Each of the first rotary wing module 2 and the second rotary wing module 3 includes at least one rotary wing, namely, the drone according to the present application may include more than two rotary wings. The first rotary wing module 2 and the second rotary wing module 3 are articulated to both sides of the drone body 1 respectively, and each of the first rotary wing module 2 and the second rotary wing module 3 is rotatable about its own articulating shaft 4, to allow both of the rotary wing modules to get close to each other to be folded or to be away from each other to be unfolded.

Apparently, the numbers of the rotary wings included in the first rotary wing module 2 and the second rotary wing module 3 may be the same or different, that is to say, the drone according to the present application includes at least two rotary wings. The specific number of the rotary wings may be an odd number or an even number, and may be set according to use requirements. It should be understood that, in the case that the numbers of the first rotary wing modules 2 and the second rotary wing modules 3 are the same, the first rotary wing modules 2 and the second rotary wing modules 3 can be completely folded, thus improving the stability of the folded drone. Also, the first rotary wing module 2 and the second rotary wing module 3 may be arranged symmetrically with respect to the drone body 1, to allow both of the rotary wing modules to form a drone having a symmetrical structure in the case that both of the rotary wing modules are unfolded, thus further improving a flying stability.

It should be noted that, the embodiments shown in FIGS. 7 to 12 are illustrated taken the rotary wing part including four rotary wings as an example, that is, each of the first rotary wing module 2 and the second rotary wing module 3 includes two rotary wings, and the two rotary wings are formed integrally or are connected sequentially. The first rotary wing module 2 and the second rotary wing module 3 are arranged symmetrically with respect to the drone body 1, namely, each of the drones shown in FIGS. 7 to 12 is a drone having four rotary wings. However, it should be appreciated by those skilled in the art that, the drone according to the present application is not limited to the structure having four rotary wings, and the number and arrangement manner of the rotary wings may be set as required. FIGS. 7 to 12 only show one specific form of the present application, which is configured to interpret the structure of the drone according to the present application, and should not be interpreted as a limitation to the present application.

As described hereinabove, the drone according to the present application includes the drone body 1 and the rotary wing part. Specifically, the rotary wing part includes the first rotary wing module 2 and the second rotary wing module 3, both of which are respectively articulated to two sides of the drone body 1, and are rotatable about their respective articulating shafts 4, thus allowing the first rotary wing module 2 and the second rotary wing module 3 to be folded to fold up the drone, or allowing the first rotary wing module 2 and the second rotary wing module 3 to be away from each other to unfold the drone. Thus, the drone according to the present application may achieve a shape change to be folded to be carried or to be unfolded to be directly used, which has a high service efficiency, and a good portability, reduces the space occupied by the drone to a large degree when the drone is folded, and may not adversely affect the normal use of the drone. In addition, the drone body 1 may be configured to internally installed with components such as various control modules and a power source, and drivers of various rotary wings may be integrated and then are built in the drone body 1, which not only improves the integrity and controllability of the drone, but also facilitates simplifying the structure of the rotary wing. In addition, the arrangement of the first rotary wing module 2 and the second rotary wing module 3 allows the relative movement of the rotary wings to be simple and reliable, there is no need to provide a folding component separately for each of the rotary wings or provide foldable rotary wings, thereby simplifying and facilitating the folding and unfolding of the drone.

In order to describe easily, surfaces, facing towards each other, of the first rotary wing module 2 and the second rotary wing module 3 when the first rotary wing module 2 and the second rotary wing module 3 are folded are defined as inner surfaces of the first rotary wing module 2 and the second rotary wing module 3, and surfaces opposite to the inner surfaces are outer surfaces of the first rotary wing module 2 and the second rotary wing module 3. Extending directions of the articulating shaft 4 are taken as front and rear directions, accordingly in a plane parallel to the inner surfaces and the outer surfaces, directions perpendicular to the front and rear directions are defined as left and right directions.

Figure 7:
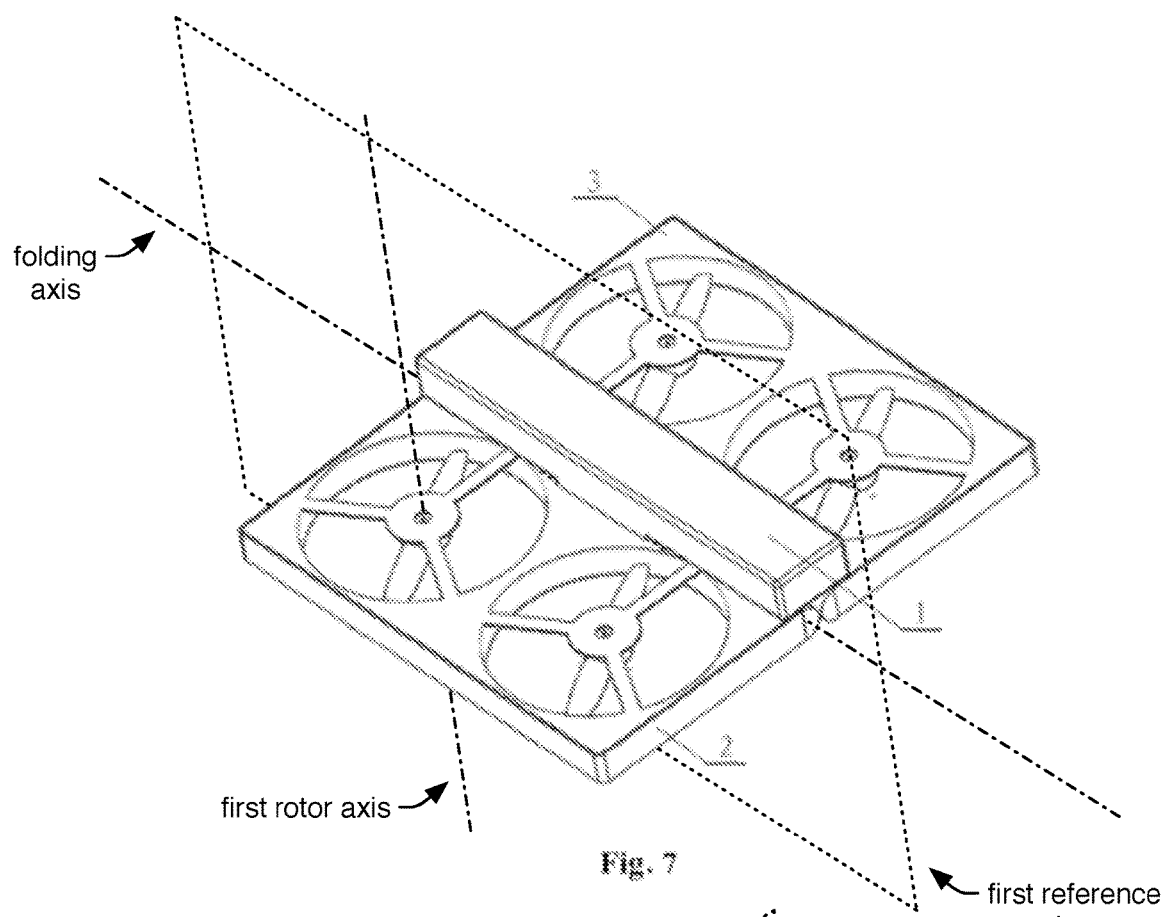
FIG. 7 is a perspective schematic view showing the structure of a foldable drone according to an embodiment of the present application in an unfolded state.

As shown in FIG. 7, in the case that the first rotary wing module 2 and the second rotary wing module 3 are in an unfolded state, the two rotary wing modules may be in the same plane, to form an aircraft having a planar structure. In this case, since the first rotary wing module 2 and the second rotary wing module 3 extend in the same plane, and there is no overlapped area, which ensures the independence of spaces occupied by the rotary wings respectively, increases a contact area of the rotary wing with airflow, and can prevent airflows surrounding the rotary wings from interfering with each other, thus further generating a sufficient lift force.

Furthermore, the first rotary wing module 2 and the second rotary wing module 3 may be in parallel with one surface of the drone body 1 when the first rotary wing module 2 and the second rotary wing module 3 are unfolded. As shown in FIG. 7, the first rotary wing module 2 and the second rotary wing module 3 may both be mounted to one surface of the drone body 1, in this case, this surface functions as a mounting surface, and the outer surfaces of the first rotary wing module 2 and the second rotary wing module 3 may both be in parallel with the mounting surface. Besides, the first rotary wing module 2 and the second rotary wing module 3 may be spliced to form a plate-shaped structure, and the drone body 1 is located on an outer surface of the plate structure. Thus in use, the inner surfaces of the first rotary wing module 2 and the second rotary wing module 3 may face downward, to allow the rotary wings to be sufficiently in contact with the airflow, to generate a sufficient lift force, and prevent the drone body 1 from adversely affecting the lifting. That is to say, the first rotary wing module 2 and the second rotary wing module 3 may both be mounted on one surface of the drone body 1, and the first rotary wing module 2 and the second rotary wing module 3 may be in parallel with the mounting surface when being unfolded, thus improving the flatness of the drone, and thereby reducing the resistance during flying.

The structures of the first rotary wing module 2, the second rotary wing module 3 and the drone body 1 may be further improved, to allow the drone body 1 to be located between the first rotary wing module 2 and the second rotary wing module 3. Thus, the first rotary wing module 2 and the second rotary wing module 3 may be in the same plane as the drone body 1 when being unfolded. That is, the first rotary wing module 2, the second rotary wing module 3, and the drone body 1 form a plate structure together, to allow the entire drone to fly as the plate structure, and to further simplify the structure of the drone, and reduce the resistance during flying.

Those skilled in the art may employ various forms to implement the above structural improvement. For example, the first rotary wing module 2 and the second rotary wing module 3 may be respectively articulated to two side surfaces of the drone body 1, namely, a left side surface and a right side surface of the drone body 1 in FIG. 7, and the drone body 1, the first rotary wing module 2 and the second rotary wing module 3 are configured to have a same thickness, thus the first rotary wing module 2 and the second rotary wing module 3 may be in the same plane as the drone body 1 when being unfolded. Or, the structure of the drone body 1 may be improved, and grooves for mounting the first rotary wing module 2 and the second rotary wing module 3 may be processed in one surface of the drone body 1, to realize an embedded mounting of the first rotary wing module 2 and the second rotary wing module 3, and to allow the first rotary wing module 2 and the second rotary wing module 3 to be in the same plane as the drone body 1 when the first rotary wing module 2 and the second rotary wing module 3 are unfolded.

Figure 8:
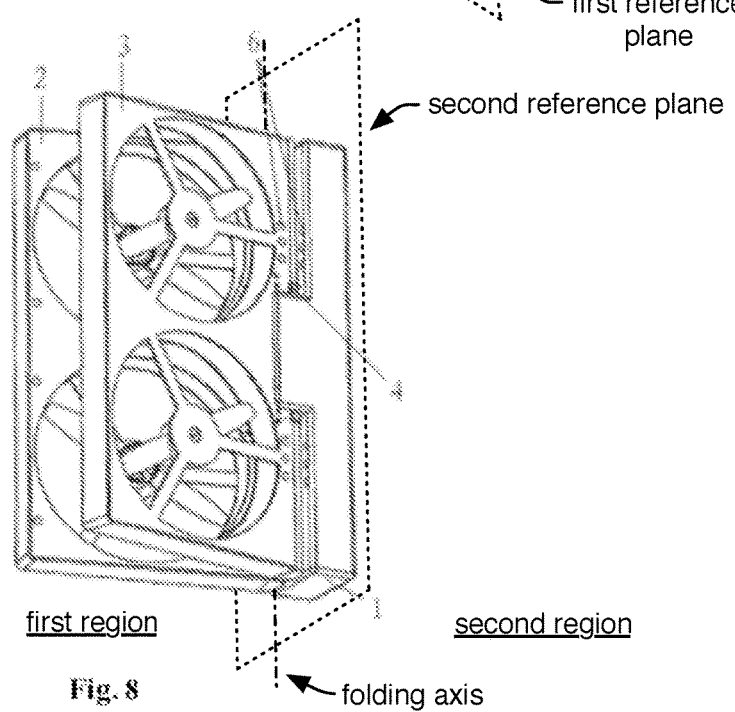
FIG. 8 is a side schematic view showing the structure of the foldable drone in FIG. 7 in a partially folded state.

As shown in FIG. 8, second positioning members 6 in cooperation with each other may be provided on surfaces, facing towards each other, of the first rotary wing module 2 and the drone body 1 respectively, and second positioning members 6 may also be provided on surfaces, facing towards each other, of the second rotary wing module 3 and the drone body 1. The first rotary wing module 2 and the second rotary wing module 3 may be fixed to the drone body 1 by the second positioning members 6 when the first rotary wing module 2 and the second rotary wing module 3 are unfolded. In the case that the first rotary wing module 2 and the second rotary wing module 3 are mounted on the mounting surface of the drone body 1, the surfaces facing towards each other may specifically refer to the outer surface of the first rotary wing module 2 and the mounting surface, and, the outer surface of the second rotary wing module 3 and the mounting surface. In the case that the first rotary wing module 2 and the second rotary wing module 3 are mounted on the left side surface and the right side surface of the drone body 1 respectively, the surfaces facing towards each other refer to a side surface of the first rotary wing module 2 and a side surface of the drone body 1 on the side corresponding to the first rotary wing module 2, and, a side surface of the second rotary wing module 3 and a side surface of the drone body 1 on the side corresponding to the second rotary wing module 3.

The second positioning members 6 may be embodied as magnets which can be attracted to each other, as shown in FIG. 8. The first rotary wing module 2 and the second rotary wing module 3 may be arranged on one surface of the drone body 1, and this surface is used as a mounting surface. The outer surfaces of the first rotary wing module 2 and the second rotary wing module 3 may be provided with the magnets, and the mounting surface of the drone body 1 may also be provided with magnets at corresponding positions. When the first rotary wing module 2 and the second rotary wing module 3 are unfolded, the magnets are attracted to each other, thus achieving a fixed connection between the first rotary wing module 2 and the drone body 1, and a fixed connection between the second rotary wing module 3 and the drone body 1. When the magnets are employed as the second positioning members 6, and when the first rotary wing module 2 and the second rotary wing module 3 are required to be folded, a small external force may be applied to overcome an attracting force of the magnets, thus the first rotary wing module 2 and the second rotary wing module 3 may be driven to rotate about their respective articulating shafts, and further are folded, thus the operation is simple and convenient.

It should be appreciated that, the second positioning members 6 may be of various structural forms, and may not be limited to the specific form of the magnets described above. For example, the drone body 1 may be provided with a track, and then the first rotary wing module 2 and the second rotary wing module 3 may each be provided with a movable member in cooperation with the track, and a position-limiting member, such as a buckle, may be provided on the track at an initial position or at any positions where positioning is required. In the case that the first rotary wing module 2 and the second rotary wing module 3 rotate about their respective articulating shafts 4, the movable member moves along the track, and when the first rotary wing module 2 and the second rotary wing module 3 rotate to a position where positioning is required, the movement of the movable member may be limited by the position-limiting member, thus achieving the positioning of the first rotary wing module 2 and the second rotary wing module 3 at this position, and in this case, the movable member, the track, and the position-limiting member together form the second positioning members 6. Or the second positioning members 6 may also be embodied in a form of a snap and a spring in cooperation with each other, thus when positioning is not required, the snap is fixed by the spring, and may not have an effect on the first rotary wing module 2 and the second rotary wing module 3; and when the first rotary wing module 2 and the second rotary wing module 3 move to any position where the first rotary wing module 2 and the second rotary wing module 3 are required to be fixed to the drone body 1, the spring may be triggered to spring out the snap, to fasten the first rotary wing module 2 and the second rotary wing module 3, thus fixing the first rotary wing module 2 and the second rotary wing module 3 to that position. A tension spring may further be provided between the first rotary wing module 2 and the drone body 1, and a tension spring may further be provided between the second rotary wing module 3 and the drone body 1, and the positioning is achieved by the tensioning force of the tension springs. That is, the second positioning members 6 may be tension springs. Or the second positioning members 6 may be fixing clamps, and in the case that the first rotary wing module 2 and the second rotary wing module 3 move to a position where the first rotary wing module 2 and the second rotary wing module 3 are required to be fixed to the drone body 1, the first rotary wing module 2 and the drone body 1, or the second rotary wing module 3 and the drone body 1 may be manually or automatically tightly clamped.

Or the positioning may also be realized by other structures, and the arranged positions of the positioning members are not limited to the surfaces, facing towards each other, of the first rotary wing module 2 and the drone body 1, and the surfaces, facing towards each other, of the second rotary wing module 3 and the drone body 1. For example, the first rotary wing module 2 and the second rotary wing module 3 may be driven to rotate by form of a motor in cooperation with a gear, or a cam, or a be pulley, and a push rod, and in this case, a motor may be utilized to lock the push rod to any desired positions. The first rotary wing module 2 and the second rotary wing module 3 may also be configured as a self-lockable leaflet structure, to be fixed at a position where the first rotary wing module 2 and the second rotary wing module 3 are required to be positioned. Or, the articulating shafts 4 may also be improved, to achieve positioning by a friction force between the articulating shaft 4 and the first rotary wing module 2, and a friction force between the articulating shaft 4 and the second rotary wing module 3.

Apparently, the first rotary wing module 2 and the second rotary wing module 3 may employ the same structures to achieve positioning of the first rotary wing module 2 and the second rotary wing module 3 to the drone body 1, or may also employ different structures, or, only one of the first rotary wing module 2 and the second rotary wing module 3 employs a positioning structure to be fixed to the drone body 1.

Figure 9:
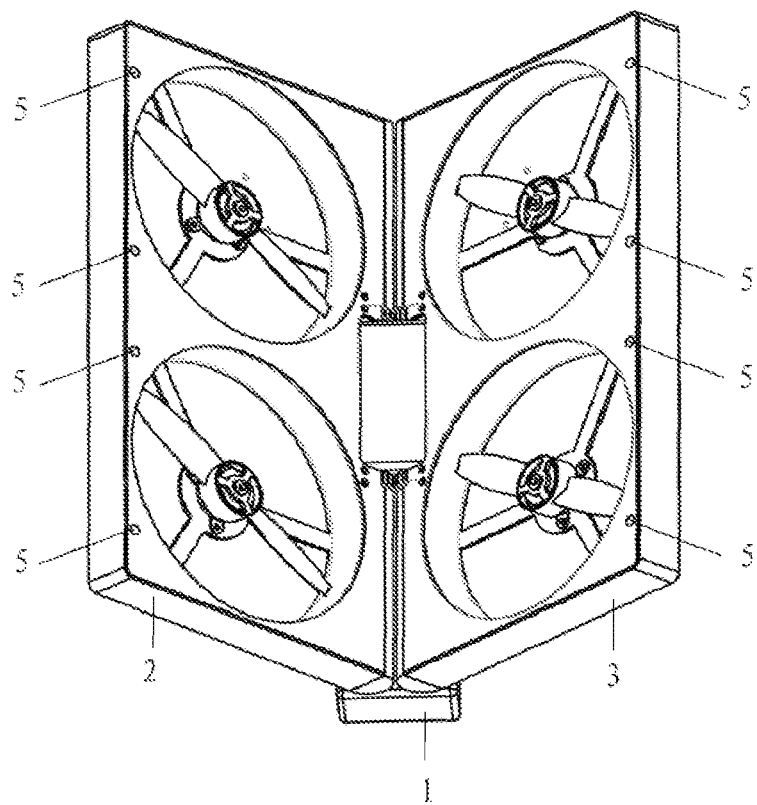
FIG. 9 is a front schematic view showing the structure of the foldable drone in FIG. 7 in the partially folded state.

Further, as shown in FIG. 9, first positioning members 5 in cooperation with each other may be provided on surfaces, facing towards each other, of the first rotary wing module 2 and the second rotary wing module 3 respectively, and the first rotary wing module 2 and the second rotary wing module 3 may be fixed to each other by the first positioning members 5 when being folded. The surfaces facing towards each other here refer to the inner surfaces of the two rotary wing modules. As shown in FIG. 9, the first positioning members 5 may also be magnets, and the magnets may be provided at positions, corresponding to each other, of the first rotary wing module 2 and the second rotary wing module 3, and the first rotary wing module 2 and the second rotary wing module 3 may be attracted by the magnets and thus are positioned when being folded. The number and positions of the magnets may be set as required by those skilled in the art. For example, for each of the two rotary wing modules, the magnets may be arranged at a side away from the articulating shafts 4, and a plurality of magnets may further be provided in an extending direction of this side at intervals, and the intervals may be equal to each other or may be adjusted as required. In the embodiment shown in FIG. 9, illustration is made taken four magnets provided as an example, and the magnets may be located at left and right sides of the inner surfaces respectively. The number and arranging positions of the magnets in the second positioning members 6 may also be set as required by those skilled in the art. The structural forms of the first positioning member 5 and the second positioning member 6 may be similar to each other, that is, those skilled in the art may arrange the first positioning member 5 by referring to the above description of the second positioning member 6, thus is not described in further detail hereinafter.

Figure 10:
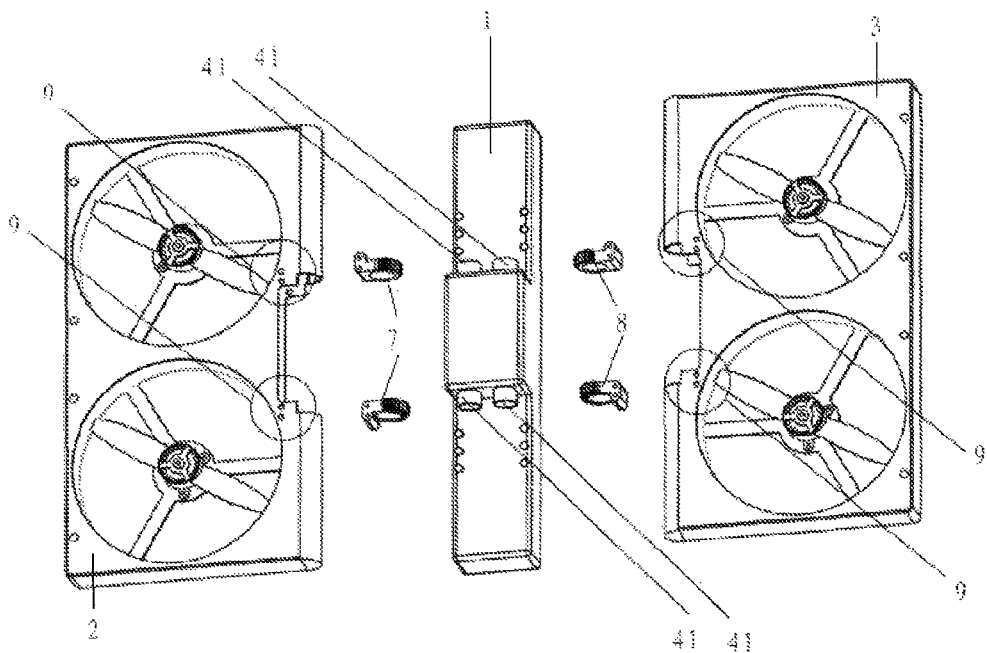
FIG. 10 is an exploded perspective view showing the assembling of the foldable drone in FIG. 7.

As shown in FIG. 10, the structures of first rotary wing module 2, the second module 3 and the drone body 1 may be specifically set by those skilled in the art. A vertical cross section of the drone body 1 (i.e., an inward and outward direction) may be of a T shape, and a vertical portion of the T shape may be configured to mount the articulating shafts 4. Each of the articulating shafts 4 may extend substantially along a direction in parallel with a transverse portion of the T-shape, and the articulating shafts 4 may extend from the vertical portion of the T shape to two ends along the transverse direction, namely, the front and rear direction in FIG. 10, and in this case, two ends of the articulating shaft 4 may form connecting ends 41. A front end and a rear end of the first rotary wing module 2 are respectively articulated to the connecting ends 41 of the articulating shaft 4 on the same side as the first rotary wing module 2, and the second rotary wing module 3 may also be articulated to the connecting ends 41 of the articulating shaft 4 on the same side as the second rotary wing module 3. It may be appreciated that, specifically, each of the articulating shafts 4 may run through the vertical portion of the T shape, or may also only include the connecting ends 41 arranged at two ends of the vertical portion, as long as the first rotary wing module 2 and the second rotary wing module 3 can form an articulation with the respective corresponding connecting ends 41, to rotate about the connecting ends 41. In this case, the connecting ends 41 at two ends are arranged coaxially, and the connecting line of the two connecting ends 41 is axis of the articulation shaft 4, and is equivalent to the articulating shaft 4.

A bottom surface of the T shape may be taken as the mounting surface; and the two articulating shafts 4 may be respectively arranged on two sides of the mounting surface, namely, the left side and right side shown in FIG. 10. No matter what kind of structure is employed, the first rotary wing module 2 and the second rotary wing module 3 may be allowed to parallel to and fit the transverse portion of the T shape after the first rotary wing module 2 and the second rotary wing module 3 are unfolded, as shown in FIG. 7.

Further, each of the first rotary wing module 2 and the second rotary wing module 3 may be arranged in a structure similar to a door plate, as shown in FIGS. 7 to 12. The following illustration is made by simply taking the structure of the first rotary wing module 2 as an example, and the second rotary wing module 3 may be configured by referring to the first rotary wing module 2. The first rotary wing module 2 may include a frame, and the frame may be configured as a structure similar to a door frame, and two mounting cavities for mounting the rotary wings are provided in the frame. Taking the first rotary wing module 2 arranged at the left side of the drone body 1 as an example, a U-shaped groove may be provided to a left side of the frame, and an opening of the U-shaped groove faces towards the articulating shaft 4 at the left side of the drone body 1 to receive the articulating shaft 4. As described above, in the case that the vertical cross section of the drone body 1 is of a T shape, the opening of the U-shaped groove may further receive the vertical portion of the T shape, thus further simplifying the structure. Two side walls of the U-shaped groove are connected to the two ends of the articulating shaft 4, to form an overall structure as shown in FIGS. 7 to 9.

Moreover, in the case that the first rotary wing module 2 and the second rotary wing module 3 are folded, the outer side surface of each of the first rotary wing module 2 and the second rotary wing module 3 may not be beyond a corresponding outer side surface of the drone body 1, i.e., the first rotary wing module 2 and each of the second rotary wing module 3 are located at a corresponding inner side of the drone body 1, to form a folded structure which has a small volume and is portable. In the embodiments shown in FIGS. 7 to 12, the outer side surfaces of the drone body 1 respectively refer to its left side surface and right side surface, i.e., the outer side surface of the first rotary wing module 2 at the left side is located at a right side of the left side surface of the drone body 1 or aligns to the left side surface of the drone body 1; and the outer side surface of the second rotary wing module 3 at the right side is located at a left side of the right side surface of the drone body 1 or aligns to the right side surface of the drone body 1. That is to say, when the drone is folded, the first rotary wing module 2 and the second rotary wing module 3 may be received to the inner sides of the drone body 1.

In the case that the structure in FIG. 10 is employed, the sides, close to the drone body 1, of the first rotary wing module 2 and the second rotary wing module 3 may each be provided with a U-shaped groove. In this case, the drone body 1 may extend into the U-shaped grooves at two sides. When being fold, the first rotary wing module 2 and the second rotary wing module 3 are respectively folded inward towards the corresponding U-shaped groove, and then the parts of the first rotary wing module 2 and the second rotary wing module 3 located at the outer sides of the drone body 1 are gradually received inward, and are eventually received to the inner sides of the drone body 1. In the embodiment shown in FIG. 10, the inner side of the drone body 1 is between the left side and the right side of the drone body 1, that is to say, the first rotary wing module 2 and the second rotary wing module 3 located at the left side and the right side may rotate towards the middle, and eventually, the both are folded to form a folded plate structure which is not beyond the left side and the right side of the drone body 1 in the left and right direction.

On this basis, the first rotary wing module 2 may also be provided with a first gear 7, and the second rotary wing module 2 may be provided with a second gear 8. The first gear 7 and the second gear 8 are engaged with each other, and axes of the first gear 7 and the second gear 8 are respectively in parallel with the respective articulating shafts 4 on the same sides as the first gear 7 and the second gear 8. Then when one of the rotary wing modules rotates about its articulating shaft 4, the gear connected to this rotary wing module is driven to rotate, and since two gears are engaged, if one of the gears rotates, the other gear may also rotate accordingly, thus the other rotary wing module is further driven to rotate. In other words, the arrangement of the first gear 7 and the second gear 8 may ensure the synchronousness in rotating of the first rotary wing module 2 and the second rotary wing module 2, and may further ensure that angles of the first rotary wing module 2 and the second rotary wing module 3 with respect to the drone body 1 always keep consistent in the folding and unfolding process, thereby improving the stability of the drone.

In addition, the first rotary wing module 2 may achieve an articulation with the drone body 1 by the first gear 7, similarly, the second rotary wing module 3 may also achieve articulation with the drone body 1 by the second gear 8. As shown in FIG. 10, the two articulating shafts 4 may be arranged in the drone body 1. The first gear 7 is sleeved on the articulating shaft 4 on the same side as the first gear 7, and the second gear 8 is respectively sleeved on the articulating shaft 4 on the same side as the second gear 8. The first gear 7 and the second gear 8 may each rotate with respect to the corresponding articulating shaft 4, and each of the first rotary wing module 2 and the second rotary wing module 3 achieves the articulation with the drone body 1 by the corresponding gear. The first gear 7 and the second gear 8 may be configured in a ring structure, and teeth engaged with each other may be arranged on outer rings of the ring structure, and inner rings may be directly sleeved on the corresponding articulating shafts 4. As described hereinbefore, each of the articulating shafts 4 may only include two connecting ends 41, and each of the two connecting ends 41 is equivalent to a short shaft, in this case, each of the connecting ends 41 may adopt a approximately sleeve-shaped structure, and then the first gear 7 and the second gear 8 may be sleeved on the respective sleeves. For improving the connecting reliability, each of the connecting ends 41 may achieve articulation by the form of gear. The number of the connecting ends 41 may also be set according to the number of the rotary wings by those skilled in the art.

Each of the first gear 7 and the second gear 8 may be integrally formed with the corresponding rotary wing module, or may be connected in detachable connection manners such as a threaded connection, a pin connection, or the like. As shown in FIG. 10, threaded holes 9 may be provided in the first rotary wing module 2 and the second rotary wing module 3, and corresponding threaded connecting holes may be provided in the first gear 7 and the second gear 8, thus the first gear 7 and the first rotary wing module 2 are connected by bolts, and the second gear 8 and the second rotary wing module 3 are also connected by bolts.

In the embodiment shown in FIGS. 7 to 10, each of the first rotary wing module 2 and the second rotary wing module 3 includes two rotary wings, and the two rotary wings may be integrally formed or connected to each other, to form a linear structure. Of course, the arrangement manner and the number of the rotary wings may be set as required by those skilled in the art.

Figure 11:
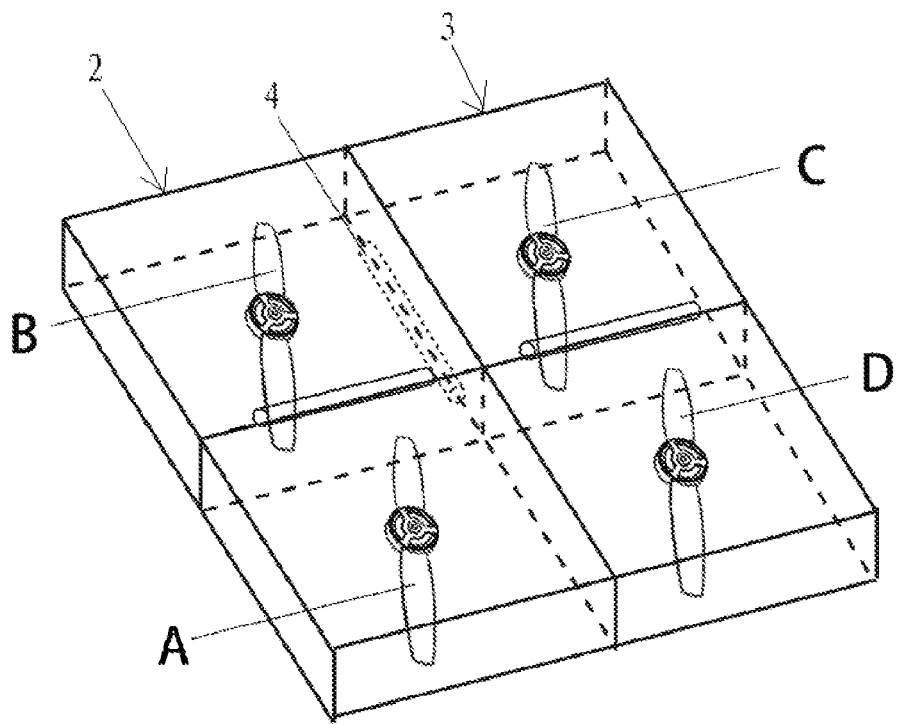
FIG. 11 is a perspective schematic view showing the structure of a foldable drone according to another embodiment of the present application in an unfolded state.
Figure 12:
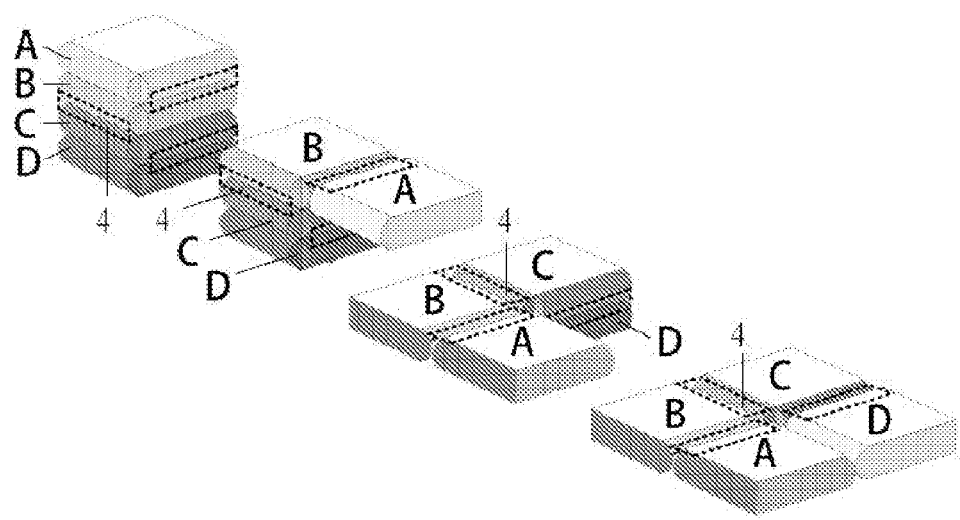
FIG. 12 is a schematic view showing an unfolding process of the drone in a folded state in FIG. 11.

Reference is further made to FIGS. 11 and 12, in the first rotary wing module 2 and the second rotary wing module 3 according to the present application, two adjacent rotary wings may be connected by articulation, i.e., for a single rotary wing module, in the case that more than two rotary wings are included, the rotary wings may also be connected by articulation. The first rotary wing module 2 and the second rotary wing module 3 each including two rotary wings are still taken as an example, the first rotary wing module 2 may include a rotary wing A and a rotary wing B, and the second rotary wing module 3 may include a rotary wing C and a rotary wing D. The rotary wing B and the rotary wing C may serve as basic rotary wings, and the rotary wing A and the rotary wing D may serve as folding rotary wings. The drone body 1 is arranged between the rotary wing B and the rotary wing C, and the rotary wing B and the rotary wing C are respectively articulated to two sides of the drone body 1, to realize the articulation of the first rotary wing module 2 and the second rotary wing module 3 to the drone body 1. For an easy description, folding in up and down directions in FIG. 12 is described. In the folding process, the rotary wing D may be turned downward to be folded beneath the rotary wing C, and then the rotary wing B is folded on the rotary wing C, and then the rotary wing A is turned upward to be folded on the rotary wing B, and thus forming the folded structure shown at the leftmost side in FIG. 12. The unfolding may be performed just in a reverse sequence.

Or, the rotary wing A may be folded on the rotary wing B first, and then the rotary wing D may be folded beneath the rotary wing C, and then the rotary wing B and the rotary wing C are folded, and the unfolding may be performed also just according to a reverse sequence.

In the case that more than two folding rotary wings are provided, the folding rotary wings may be folded to the basic rotary wing in sequence, or the folding rotary wings may be unfolded from the basic rotary wing in a reverse sequence. Moreover, the dashed line blocks in FIG. 12 represent the connecting shafts for articulation of the rotary wings.

It is to be noted that, for simplifying the structure here, the drone body 1 is not shown in FIGS. 11 and 12. Those skilled in the art may also omit the drone body 1 as desired, and articulate the rotary wings in sequence directly, and the articulation form may employ a structure similar to the articulating shafts 4 described above.

The foldable drone according to the present application is described in detail hereinbefore. The principle and the embodiments of the present application are illustrated herein by specific examples. The above description of examples is only intended to help the understanding of the core concept of the present application. It should be noted that, for those skilled in the art, a few of modifications and improvements may be made to the present application without departing from the principle of the present application, and these modifications and improvements are also deemed to fall into the scope of the present application defined by the claims.

In some embodiments, the drone can include some or all aspects as described above regarding both the foldable drone and the fully protected drone. For example, the foldable drone can include some or all aspects described above regarding the fully protected drone (e.g., can include one or more elements that can prevent objects from contacting the rotary wing(s), such as elements of a protection housing that can prevent ingress of objects such as a human hand into the housing interior), and/or the fully protected drone can include some or all aspects described above regarding the foldable drone (e.g., can be configured to fold along one or more axes, such as including a first rotary wing module and a second rotary wing module, both of which are respectively articulated to two sides of the drone body, wherein the first rotary wing module and the second rotary wing module may rotate about their respective articulating shafts, to allow the first rotary wing module and the second rotary wing module to be folded).

In some embodiments, the rotorcraft includes: a first housing; a first rotor rotationally coupled to the first housing about a first rotor axis, wherein the first rotor is enclosed by the first housing; a second housing rotationally coupled to the first housing about a folding axis; and a second rotor rotationally coupled to the second housing about a second rotor axis, wherein the second rotor is enclosed by the second housing; wherein the rotorcraft is operable to transition between a folded configuration and an unfolded configuration. In some embodiments, in the unfolded configuration, the rotorcraft defines a first reference plane, the first reference plane parallel the first rotor axis, the first reference plane comprising the folding axis; and the first rotor axis opposes the second rotor axis across the first reference plane. In some embodiments, in the folded configuration, the rotorcraft defines a second reference plane, the second reference plane parallel the first rotor axis, the second reference plane comprising the folding axis; the second reference plane divides space into a first region and a second region opposing the first region across the second reference plane; the first rotor axis and the second rotor axis are arranged within the first region; and the first rotor axis and the second rotor axis are substantially parallel.

An alternative embodiment preferably implements the some or all of above methods in a computer-readable medium storing computer-readable instructions. The instructions are preferably executed by computer-executable components preferably integrated with a communication routing system. The communication routing system may include a communication system, routing system and a pricing system. The computer-readable medium may be stored on any suitable computer readable media such as RAMs, ROMs, flash memory, EEPROMs, optical devices (CD or DVD), hard drives, floppy drives, or any suitable device. The computer-executable component is preferably a processor but the instructions may alternatively or additionally be executed by any suitable dedicated hardware device.

Although omitted for conciseness, embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

The FIGURES illustrate the architecture, functionality and operation of possible implementations of systems, methods and computer program products according to preferred embodiments, example configurations, and variations thereof. In this regard, each block in the flowchart or block diagrams may represent a module, segment, step, or portion of code, which comprises one or more executable instructions for implementing the specified logical function(s). It should also be noted that, in some alternative implementations, the functions noted in the block can occur out of the order noted in the FIGURES. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As a person skilled in the art will recognize from the previous detailed description and from the figures and claims, modifications and changes can be made to the preferred embodiments of the invention without departing from the scope of this invention defined in the following claims.

We claim:

1. A rotorcraft comprising:
   a first housing comprising a first top surface and a first bottom surface opposing the first top surface;
   a first rotor, rotationally coupled to the first housing about a first rotor axis, wherein the first rotor is enclosed by the first housing and arranged along the first rotor axis between the first top surface and the first bottom surface, wherein the first rotor comprises a first rotor blade;
   a second housing separate from the first housing, the second housing rotationally coupled to the first housing about a folding axis, the second housing comprising a second top surface and a second bottom surface opposing the second top surface;

a second rotor, rotationally coupled to the second housing about a second rotor axis, wherein the second rotor is enclosed by the second housing and arranged along the second rotor axis between the second top surface and the second bottom surface, wherein the second rotor comprises a second rotor blade;

a third rotor comprising a third rotor blade, the third rotor enclosed by the first housing, the third rotor substantially non-coaxial with the first rotor; and a fourth rotor comprising a fourth rotor blade, the fourth rotor enclosed by the second housing, the fourth rotor substantially non-coaxial with the second rotor.

2. The rotorcraft of claim 1, wherein the first top surface comprises a first mesh structure defining a first plurality of apertures and the first bottom surface comprises a second mesh structure defining a second plurality of apertures.

3. The rotorcraft of claim 2, wherein each aperture of the first and second pluralities defines a respective width less than 12 mm.

4. The rotorcraft of claim 2, wherein each aperture of the first and second pluralities defines a respective circumscribed circle having a respective diameter between 6 mm and 8 mm.

5. The rotorcraft of claim 1, wherein the first top surface and the first bottom surface each define a hollow rate between 80% and 90%.

6. The rotorcraft of claim 1, further comprising a first motor rotationally coupling the first rotor to the first top surface about the first rotor axis, wherein the first motor defines a first motor rotation axis substantially coaxial with the first rotor axis.

7. The rotorcraft of claim 1, wherein the folding axis is substantially perpendicular to the first rotor axis.

8. The rotorcraft of claim 1, further comprising a body rotationally coupling the first housing to the second housing about the folding axis, wherein:

the body is rotationally coupled to the first housing about the folding axis; and the body is rotationally coupled to the second housing about a second folding axis substantially parallel the first folding axis.

9. A rotorcraft comprising:

a first housing;

a first rotor rotationally coupled to the first housing about a first rotor axis, wherein the first rotor is enclosed by the first housing, wherein the first rotor comprises a first rotor blade;

a second housing separate from the first housing, the second housing rotationally coupled to the first housing about a folding axis;

a second rotor rotationally coupled to the second housing about a second rotor axis, wherein the second rotor is enclosed by the second housing, wherein the second rotor comprises a second rotor blade;

a third rotor comprising a third rotor blade, the third rotor enclosed by the first housing, the third rotor substantially non-coaxial with the first rotor; and a fourth rotor comprising a fourth rotor blade, the fourth rotor enclosed by the second housing, the fourth rotor substantially non-coaxial with the second rotor;

wherein the rotorcraft is operable to transition between a folded configuration and an unfolded configuration.

10. The rotorcraft of claim 9, further comprising a body rotationally coupling the first housing to the second housing about the folding axis, wherein:

the body is rotationally coupled to the first housing about the folding axis;

the body is rotationally coupled to the second housing about a second folding axis substantially parallel the first folding axis; and in the unfolded configuration, the first housing opposes the second housing across the body.

11. The rotorcraft of claim 9, wherein:

in the folded configuration, the first rotor axis is substantially coaxial with the second rotor axis; and in the unfolded configuration, the first rotor axis opposes the second rotor axis across the folding axis.

12. The rotorcraft of claim 9, wherein:

in the unfolded configuration:

the rotorcraft defines a first reference plane, the first reference plane parallel the first rotor axis, the first reference plane comprising the folding axis; and the first rotor axis opposes the second rotor axis across the first reference plane; and in the folded configuration:

the rotorcraft defines a second reference plane, the second reference plane parallel the first rotor axis, the second reference plane comprising the folding axis;

the second reference plane divides space into a first region and a second region opposing the first region across the second reference plane;

the first rotor axis and the second rotor axis are arranged within the first region; and the first rotor axis and the second rotor axis are substantially parallel.

13. The rotorcraft of claim 9, further comprising a first motor rotationally coupling the first rotor to the first housing, wherein the first motor defines a first motor rotation axis substantially coaxial with the first rotor axis.

14. The rotorcraft of claim 13, wherein:

the first housing comprises a top surface and a bottom surface opposing the top surface;

the first rotor is arranged along the first rotor axis between the top surface and the bottom surface;

the first motor is arranged along the first rotor axis between the first rotor and the top surface; and the first motor rotationally couples the first rotor to the first housing at the top surface.

15. The rotorcraft of claim 9, wherein the first housing comprises a first mesh structure defining a first plurality of apertures and the second housing comprises a second mesh structure defining a second plurality of apertures.

16. The rotorcraft of claim 15, wherein the first housing and the second housing each define a hollow rate between 80% and 90%.

17. A rotorcraft comprising:

a first housing defining a first plurality of openings;

a first rotor enclosed by and rotationally coupled to the first housing;

a second housing defining a second plurality of openings; and a second rotor enclosed by and rotationally coupled to the second housing;

wherein each opening of the first and second pluralities has a width less than 12 mm.

18. The rotorcraft of claim 17, wherein each opening of the first and second pluralities defines a respective circumscribed circle having a respective diameter between 6 mm and 8 mm.

19. The rotorcraft of claim 17, wherein the first housing and the second housing each define a hollow rate greater than 80%.

20. The rotorcraft of claim 17, wherein the first housing comprises a longitudinal side, wherein the first housing is rotationally coupled to the second housing along the longitudinal side.

21. The rotorcraft of claim 1, wherein:
the third rotor is arranged along a first direction from the first rotor axis, wherein the first direction is substantially parallel the folding axis; and
the fourth rotor is arranged along a second direction from the second rotor axis, wherein the second direction is substantially parallel the folding axis.

22. The rotorcraft of claim 1, wherein:
the first rotor defines a rotor diameter; and
a distance between the first rotor and the second rotor is less than the rotor diameter.

\* \* \* \* \*

UNITED STATES PATENT AND TRADEMARK OFFICE
CERTIFICATE OF CORRECTION

PATENT NO. : 10,358,214 B2
APPLICATION NO. : 16/024446
DATED : July 23, 2019
INVENTOR(S) : Tong Zhang et al.

It is certified that error appears in the above-identified patent and that said Letters Patent is hereby corrected as shown below:

On the Title Page

Column 1, (73) Assignee, Delete "Zro" and insert --Zero-- therefor

Signed and Sealed this
Third Day of March, 2020

Andrei Iancu
*Director of the United States Patent and Trademark Office*